(12) United States Patent
Nutt et al.

(10) Patent No.: US 9,266,593 B2
(45) Date of Patent: Feb. 23, 2016

(54) HULL MOUNTED, STEERABLE MARINE DRIVE WITH TRIM ACTUATION

(71) Applicant: Blue Sky Marine, LLC, Knoxville, TN (US)

(72) Inventors: Robert E. Nutt, Knoxville, TN (US); Scott Crutchfield, Knoxville, TN (US); Robert Scott Beach, Knoxville, TN (US); Douglas J. Yoder, Oshkosh, WI (US); Douglas G. Bickelhaupt, Oshkosh, WI (US); George Edward Phillips, Oshkosh, WI (US); David J. Gruenwald, Menasha, WI (US); Bryan L. Danner, Oshkosh, WI (US)

(73) Assignee: Blue Sky Marine, LLC, Knoxville, TN (US)

( * ) Notice: Subject to any disclaimer, the term of this patent is extended or adjusted under 35 U.S.C. 154(b) by 7 days.

(21) Appl. No.: 14/455,359

(22) Filed: Aug. 8, 2014

(65) Prior Publication Data

US 2015/0050849 A1 Feb. 19, 2015

Related U.S. Application Data

(60) Provisional application No. 61/866,296, filed on Aug. 15, 2013.

(51) Int. Cl.
*B63H 5/125* (2006.01)
*B63H 20/12* (2006.01)
(Continued)

(52) U.S. Cl.
CPC .............. *B63H 20/12* (2013.01); *B63H 20/02* (2013.01); *B63H 20/04* (2013.01); *B63H 20/10* (2013.01); *B63H 20/34* (2013.01); *B63B 39/061* (2013.01); *B63H 5/10* (2013.01); *B63H 2020/025* (2013.01)

(58) Field of Classification Search
CPC ........ B63H 20/12; B63H 20/04; B63H 20/34; B63H 20/02; B63H 20/10; B63H 5/10; B63H 2020/025; B63H 5/125; B63H 2005/1254; B63H 2005/1256; B63B 39/061
USPC ............................ 440/53, 55, 56, 61 S, 61 T
See application file for complete search history.

(56) References Cited

U.S. PATENT DOCUMENTS 2,076,603 A 4/1937 Svendsen
2,891,744 A 6/1959 Hirst et al.
(Continued)

FOREIGN PATENT DOCUMENTS

GB 833343 4/1960

*Primary Examiner* — Anthony Wiest
(74) *Attorney, Agent, or Firm* — Pitts & Lake, P.C.

(57) ABSTRACT

A hull mounted, steerable marine drive system having trim actuation is both steerable through 360 degrees and is trimmable in a range of from approximately +3 degrees to approximately −15 degrees. The marine drive system includes a watertight enclosure assembly for sealing the hull, which is adapted for keeping much of the marine drive system from being exposed to water. The enclosure includes a gasket flange plate, a retention plate and a folded gasket. The gasket flange plate closely follows the contour of the hull and enhances the hydrodynamic and wake performance of the present marine drive system. Further, marine drive system includes a forward-neutral-reverse (FNR) transmission assembly, a drive unit assembly having a trimmable upper unit and a steerable lower unit, a steering actuator assembly, a trim actuator assembly, and, preferably, trim foils for enhancing lift to assist in getting the boat up on plane.

10 Claims, 26 Drawing Sheets

(51) Int. Cl.
    *B63H 20/10*     (2006.01)
    *B63H 20/02*     (2006.01)
    *B63H 20/04*     (2006.01)
    *B63H 20/34*     (2006.01)
    *B63B 39/06*     (2006.01)
    *B63H 5/10*     (2006.01)

(56) References Cited

U.S. PATENT DOCUMENTS

| | | | |
|---|---|---|---|
| 2,976,836 | A | 3/1961 | Fageol |
| 2,977,923 | A | 4/1961 | Bergstedt |
| 3,006,311 | A | 10/1961 | Hansson et al. |
| 3,083,679 | A | 4/1963 | Conover |
| 3,204,598 | A | 9/1965 | Sharp |
| 3,626,467 | A | 12/1971 | Mazziotti |
| 3,654,889 | A | 4/1972 | Bergstedt |
| 3,982,496 | A | 9/1976 | Blanchard |
| 4,040,378 | A | 8/1977 | Blanchard |
| 4,236,478 | A | 12/1980 | Mansson |
| 4,501,560 | A | 2/1985 | Brandt et al. |
| 4,543,068 | A | 9/1985 | Brandt et al. |
| 4,717,130 | A | 1/1988 | Barkhage |
| 5,364,295 | A | 11/1994 | Rodskier |
| 5,376,033 | A | 12/1994 | Rodskier |
| 5,509,834 | A | 4/1996 | Rodskier |
| 5,514,013 | A | 5/1996 | Rodskier |
| 6,113,444 | A | 9/2000 | Ritger |
| 6,609,939 | B1 * | 8/2003 | Towner .......... B63H 5/125 440/111 |
| 7,182,657 | B2 | 2/2007 | Mansson |
| 7,188,581 | B1 * | 3/2007 | Davis .......... B63B 39/061 114/285 |
| 7,294,031 | B1 | 11/2007 | Davis et al. |
| 7,485,018 | B2 | 2/2009 | Wilson et al. |
| 7,690,959 | B1 | 4/2010 | Szilagyi et al. |
| 8,011,983 | B1 | 9/2011 | Davis et al. |
| 8,708,760 | B2 | 4/2014 | Davis et al. |
| 2002/0127928 | A1 | 9/2002 | Buzzi |
| 2003/0183149 | A1 | 10/2003 | Jessen et al. |
| 2011/0195619 | A1 | 8/2011 | Davis et al. |
| 2014/0342622 | A1 | 11/2014 | Davis et al. |

* cited by examiner

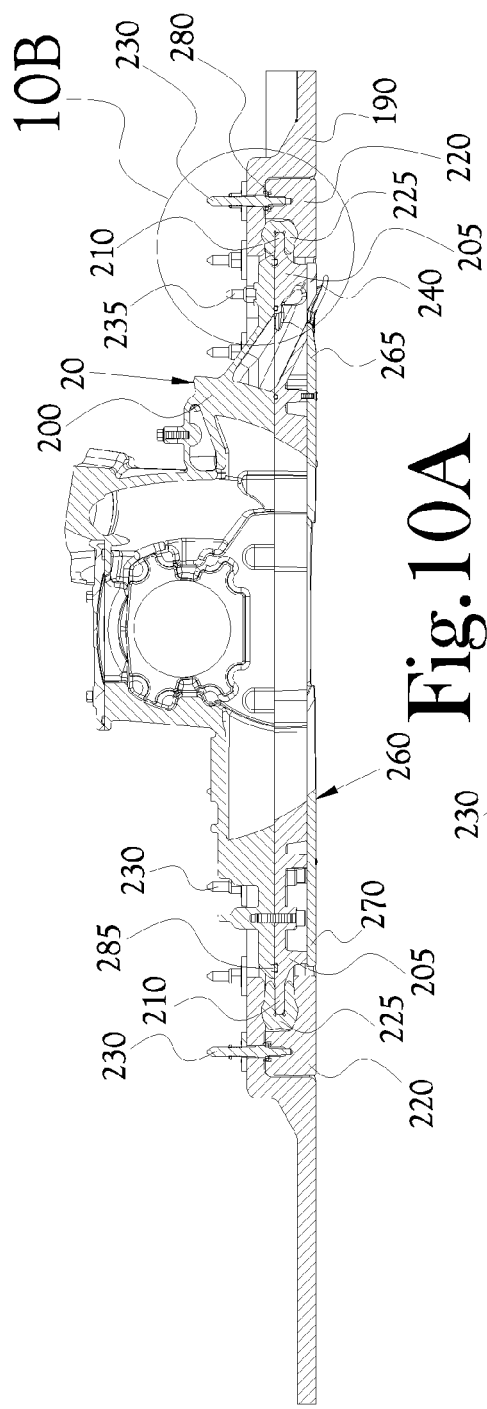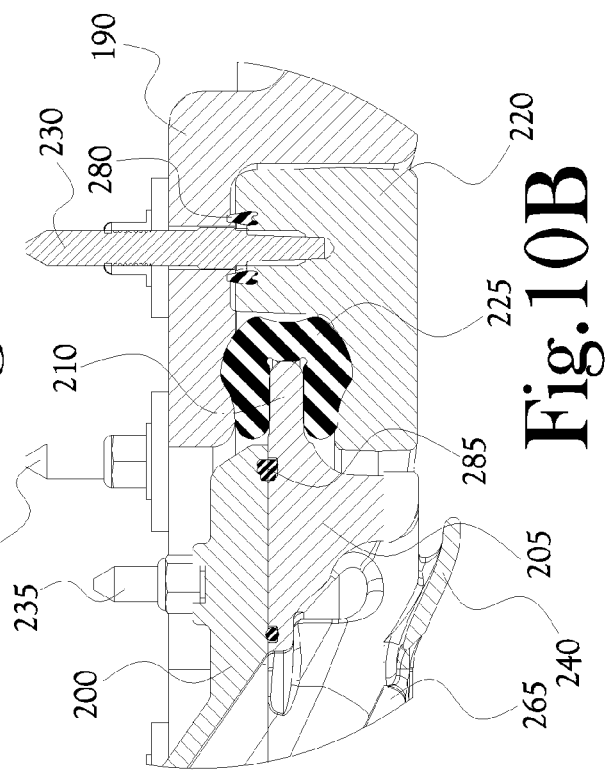

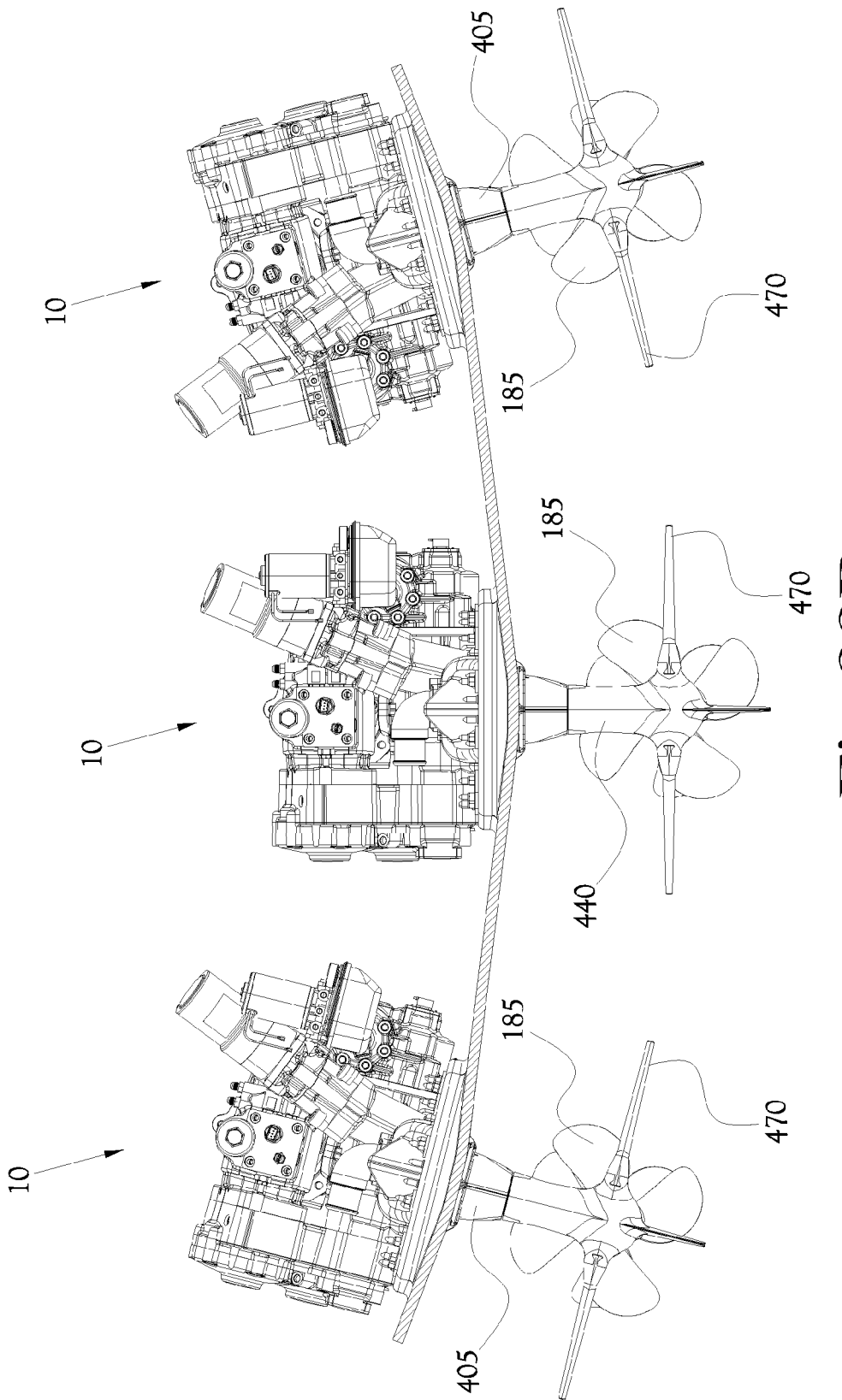

HULL MOUNTED, STEERABLE MARINE DRIVE WITH TRIM ACTUATION

CROSS-REFERENCE TO RELATED APPLICATIONS

The present application claims priority to Provisional Patent Application No. 61/866,296 filed on Aug. 15, 2013.

STATEMENT REGARDING FEDERALLY SPONSORED RESEARCH OR DEVELOPMENT

Not Applicable

BACKGROUND OF THE INVENTION

1. Field of Invention

The present application is directed to marine propulsion systems. More specifically, it is directed towards a hull mounted drive system that is both steerable and trimmable and which allows for the opening in the hull to be substantially sealed thereby allowing for greatly enhanced hydrodynamic efficiency and wake performance.

2. Description of Related Art

The general types of pleasure boat drives include inboard outboard (I/O) drives (or stern drives), outboard drives, inboard drives (including V drives) and pod drives. An outboard motor is a propulsion system for boats consisting of a self-contained unit that includes engine, gearbox and propeller or jet drive, designed to be affixed to the outside of the boat transom.

An I/O drive is a form of marine propulsion which combines inboard power with outboard drive. The engine typically sits just forward of the boat transom while the drive unit (outdrive) lies outside the boat hull. I/O drives are mounted on the rear most, vertical transom of the boat and offer advantages in the ability to trim, positively and negatively from neutral (water level), to adjust the running attitude of the boat. An I/O may include dual counter rotating propellers that are power efficient and deliver greater acceleration. However I/O drives nominally offer only +/−30 degrees of steering angle, and from their rear most mounting position on the back of the boat, I/O drives are at a disadvantage when it comes to steering and trimming leverage. This can result in excessive bow rise under acceleration and excessive roll when steering on plane. In addition, I/Os provide a significant prop strike risk to swimmers, surfers, tubers, etc. because the propeller of an I/O extends beyond the rear of the boat.

Inboard drive systems and V Drive systems typically have their propellers mounted under the boat and slightly forward of the rear transom, and offer superior leverage for steering and quicker time to plane with less bow rise compared with an I/O drive. However, traditional inboards offer no adjustable trim, nor do they traditionally offer dual counter rotating props. Therefore, it is recognized in the art that inboards are, typically, less efficient and can be 20% slower at top speed when compared with an I/O. Because they typically must rely on a rudder for steering, inboards also suffer from a lack of directional control in reverse. This can make docking difficult for inexperienced boaters. However, with the prop located a significant distance under the boat, the threat of a prop strike to a swimmer is greatly reduced.

Pod drives are relatively new power systems that eliminate the need for shafts, struts, and rudders. Instead of using traditional running gear to transfer the engine's power into thrust, a "pod" consists of the transmission, outdrive, and propeller(s) mounted through the bottom of the boat. The pod itself rotates to direct propeller thrust thereby eliminating the need for rudders. Pods generally have been developed for large motor yachts where they offer improved efficiency with the need for dual counter rotating props and greater low speed maneuverability because of a 360 degree of steering angle, but to date, pod drives do not offer trimming to adjust the running attitude of the boat. Instead, pods offer only trim tabs, which increase drag, to adjust the trim angle.

U.S. Pat. No. 7,485,018, issued to Wilson et al. on Feb. 3, 2009, discloses a marine drive assembly that includes upper and lower units in which the upper unit is pivotally attached within a cavity formed in the hull for adjusting the pitch of the drive assembly and further in which the lower unit is steerable. Among other things, Wilson teaches that his marine drive unit is disposed within a hull cavity that is exposed to the elements and expected to fill with water while the vessel is idle or underway. This also necessitates that the hydraulic motor for steering Wilson's drive unit is also exposed to water. Further, Wilson teaches the use of a push-pull rod for adjusting the drive unit's trim angle. It will be appreciated that Wilson's open hull cavity, which by design is expected to fill with water will adversely impact hydrodynamic efficiency and wake performance such that while Wilson's drive unit may be very serviceable for large slow vessels, Wilson's drive unit would not be well suited to high performance or sport boats for which hydrodynamic efficiency and wake performance are highly desirable traits. The present invention is intended to overcome these problems with hydrodynamic efficiency and wake performance in high performance and sport boats, to provide a more efficient and less space consuming method of trimming the drive unit, and also to prevent the hydraulic motor for the steering unit from being exposed to water.

Accordingly, it is an object of the present invention to provide a hull mounted, steerable marine drive system, similar to a pod drive, that also includes trim actuation. Another object of the present invention is to provide such a steerable and trimmable marine drive system while preserving the contour of the hull so as to provide greatly enhanced hydrodynamic efficiency and wake performance. Still another object of the present invention is to provide a marine drive system that is both steerable and trimmable that protects its hydraulic or electrical systems from being submerged in water. Still yet a further object of the present invention is to provide a marine drive system that is both steerable and trimmable that incorporates a foil that moves with the trimming of the drive unit which is adapted to provide enhanced lift both positively and negatively. These and other objects and advantages over the prior art will become apparent to those skilled in the art upon reading the detailed description together with the drawings.

BRIEF SUMMARY OF THE INVENTION

The hull mounted, steerable marine drive system having trim actuation of the present invention is both steerable through 360 degrees and is trimmable in a range of from approximately +3 degrees to approximately −15 degrees. In the preferred embodiment, the marine drive system includes an enclosure assembly for sealing the hull and which is adapted for keeping much of the marine drive system from being exposed to water. The enclosure assembly includes, among other things, a gasket flange plate and a method for sealing the boat hull. The enclosure assembly incorporates a split shroud plate that closely follows the contour of the hull and that enhances the hydrodynamic and wake performance of the present marine drive system over the prior art. Further, the marine drive system includes a forward-neutral-reverse (FNR) transmission assembly, a drive unit assembly which includes a trim foil for enhancing the trim performance of the drive unit, a steering actuator assembly, a trim actuator assembly, and, in the preferred embodiment, a breakaway detachment system that protects the components above the hull in the event of a significant collision with a submerged object. Further, the motor and the drive unit are preferably mounted on the centerline of the boat. In the preferred embodiment, the main vertical drive shaft is concentric with the steering axis of rotation and passes through a main trunnion hub. In the preferred embodiment, the main trunnion hub is concentric with an axis of trim rotation.

In the preferred embodiment, the drive unit assembly is comprised of four main sub-assemblies: the upper unit, the lower unit, the torpedo-shaped propeller shaft housing supporting the propeller(s), and the trim foils carried by the torpedo-shaped propeller shaft housing. The upper unit is trimmable and is engaged and acted upon by the trim actuation assembly. The lower unit is carried by the steering shaft which in turn is supported by the trimming upper unit, and is steerable through 360 degrees of steering and is engaged and acted upon by the steering actuation assembly.

BRIEF DESCRIPTION OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 10A and 10B are cross-sectional views of the enclosure assembly taken at cut-line 10 in FIG. 9. FIG. 10B is a close-up taken at Circle "FIG. 10B" in FIG. 10A.

FIGS. 22A and 22B are partial cross-sectional views showing the marine drive of the present invention installed as a dual drive, in FIG. 22A, and installed as a triple drive, in FIG. 22B.

DETAILED DESCRIPTION

Figure 1:
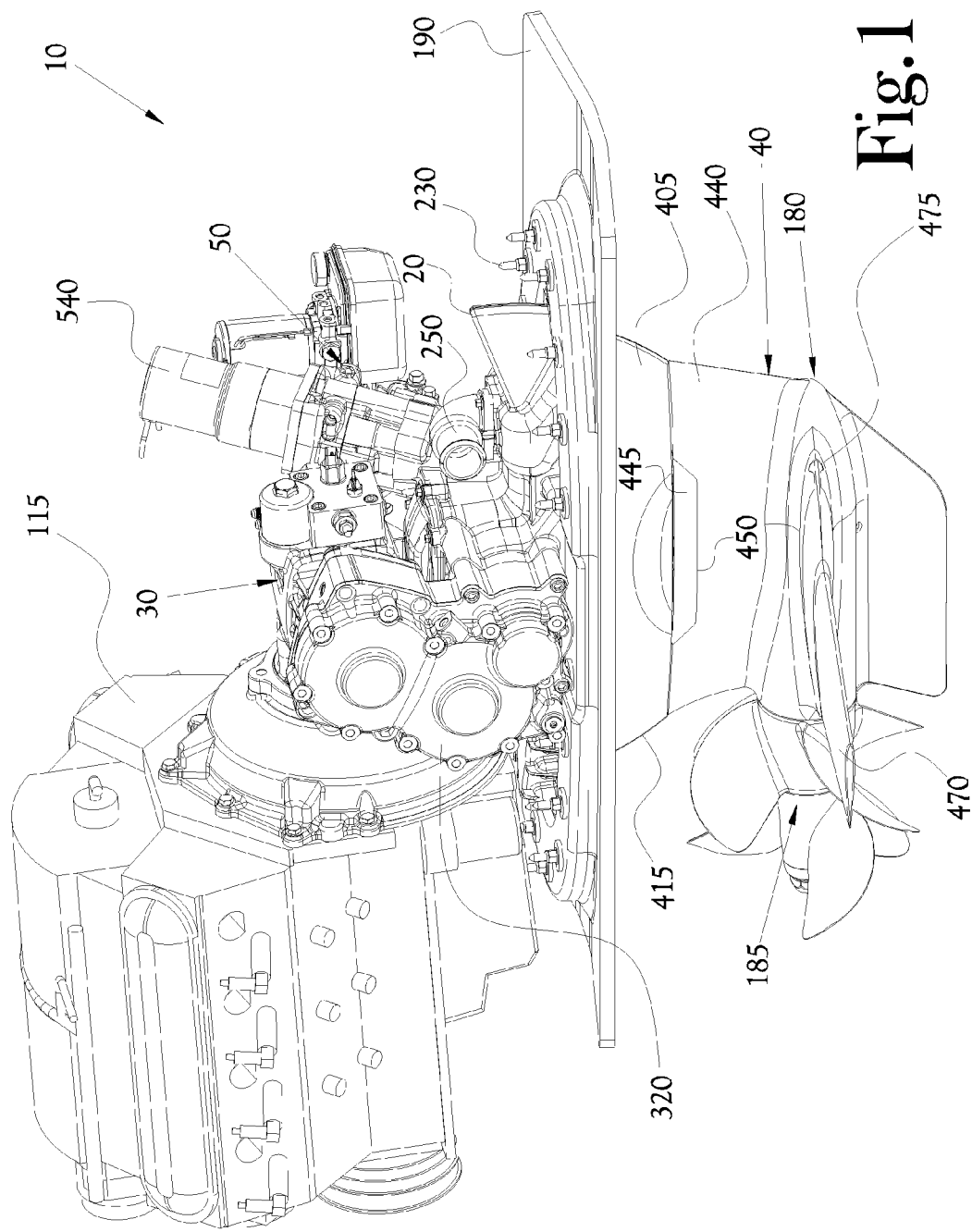
FIG. 1 is a right, front, upper perspective view of the hull mounted, steerable marine drive with trim actuation of the present invention including a marinized motor.
Figure 2:
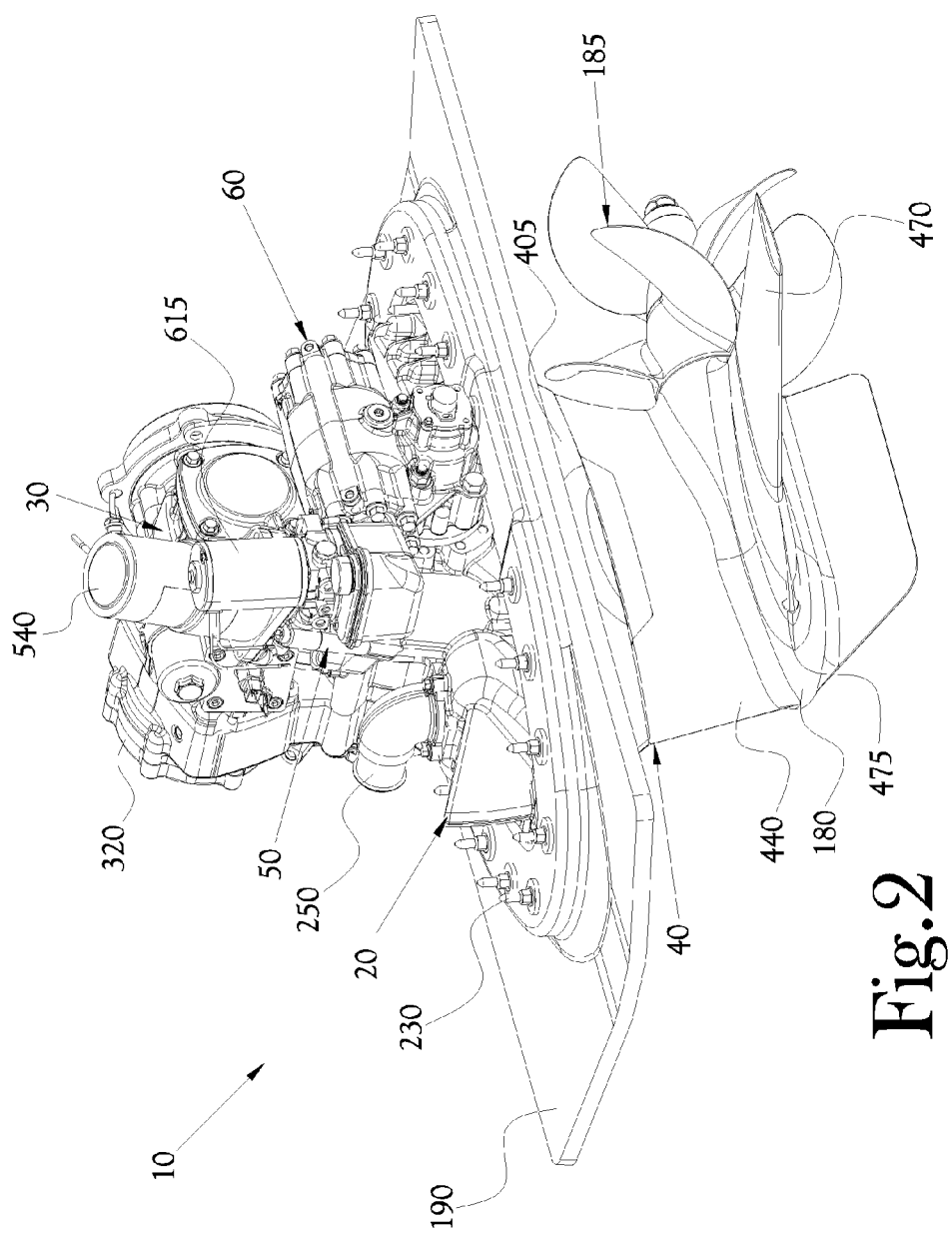
FIG. 2 is a left, front, upper perspective view of the marine drive of the present invention as illustrated in FIG. 1 in which the marinized motor has been removed for clarity of view.
Figure 3:
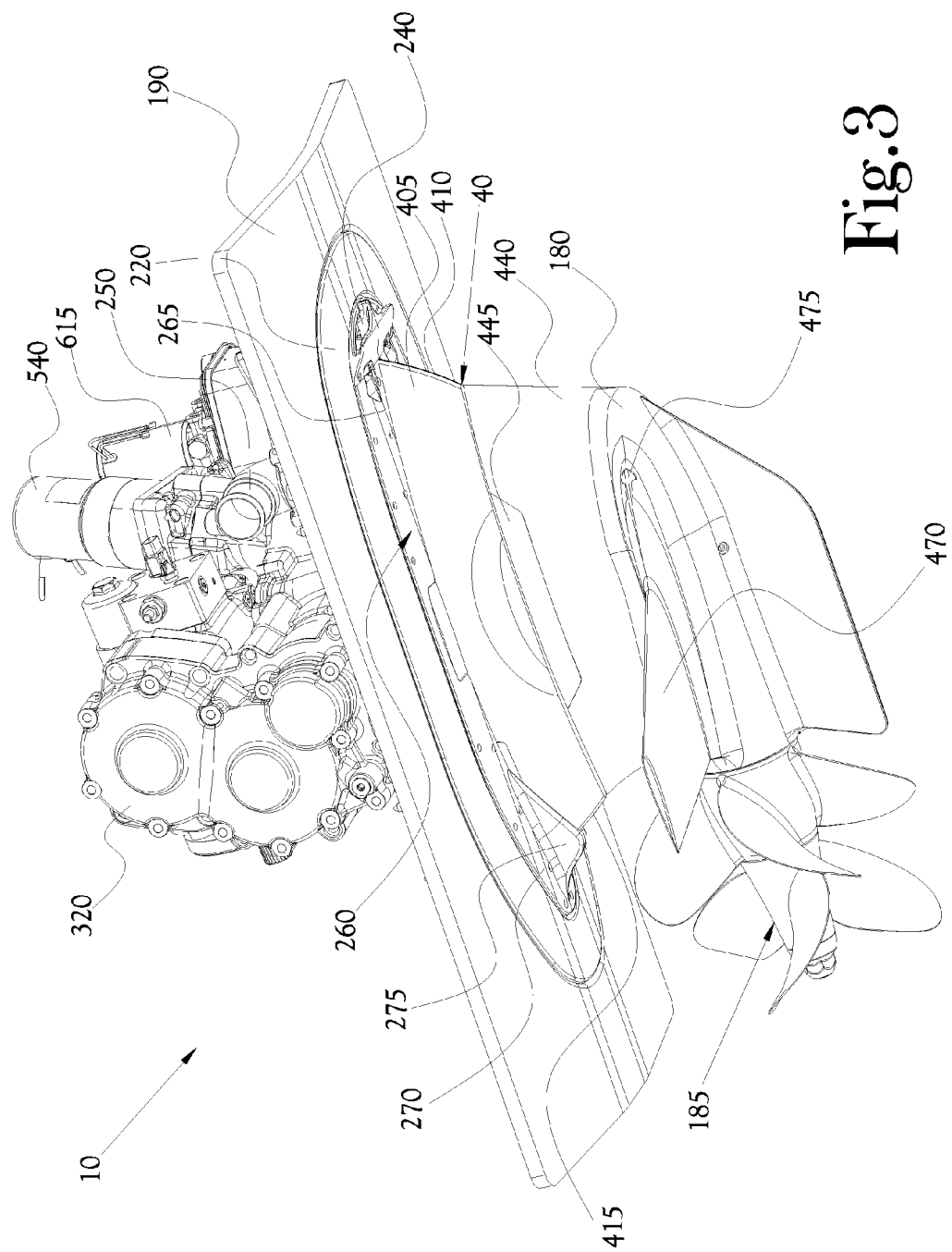
FIG. 3 is a right, lower perspective view of the marine drive illustrated in FIG. 2.
Figure 4:
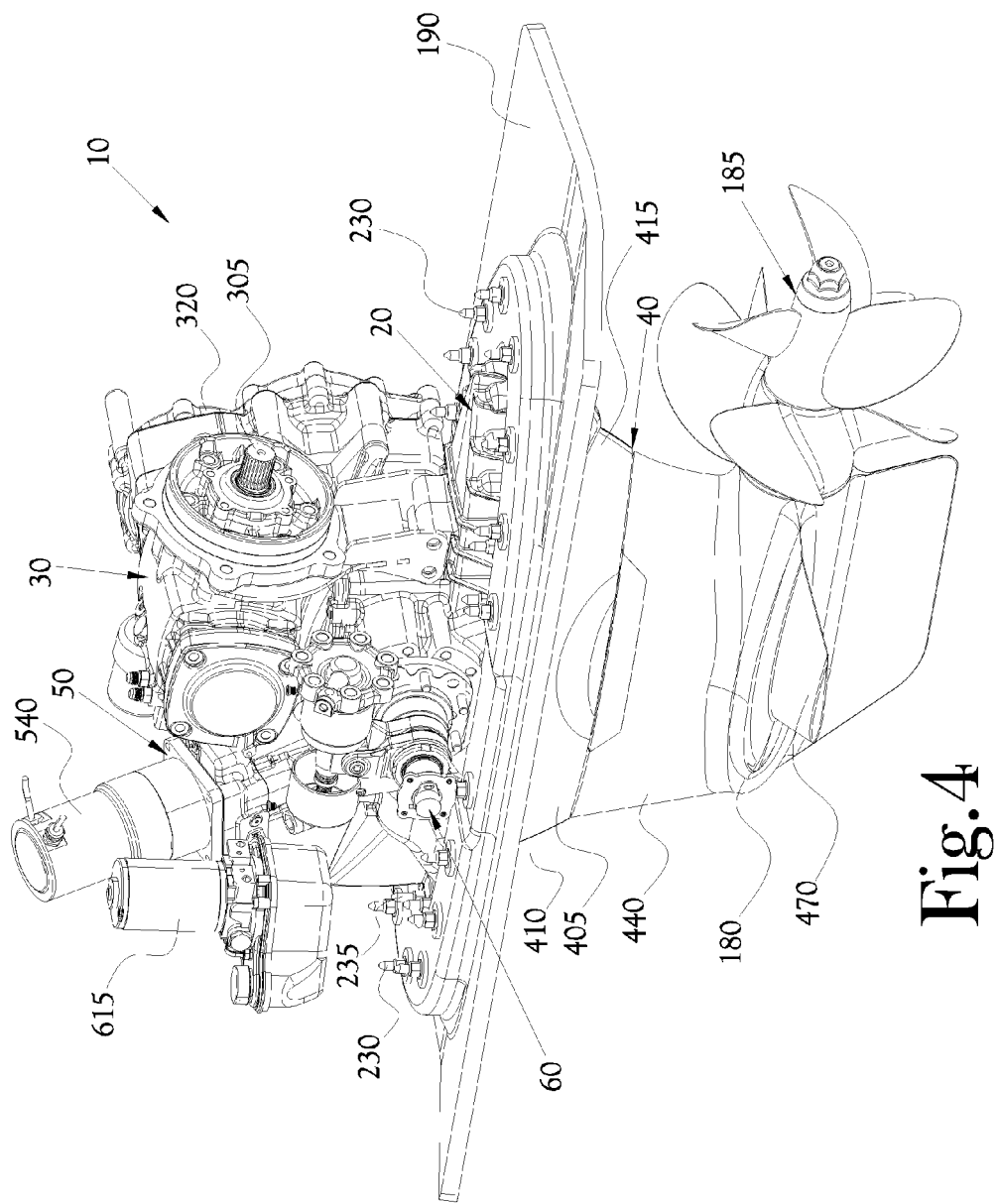
FIG. 4 is a left, rear upper perspective view of the marine drive illustrated in FIG. 2 with portions of the trim casing removed for clarity of view.
Figure 5:
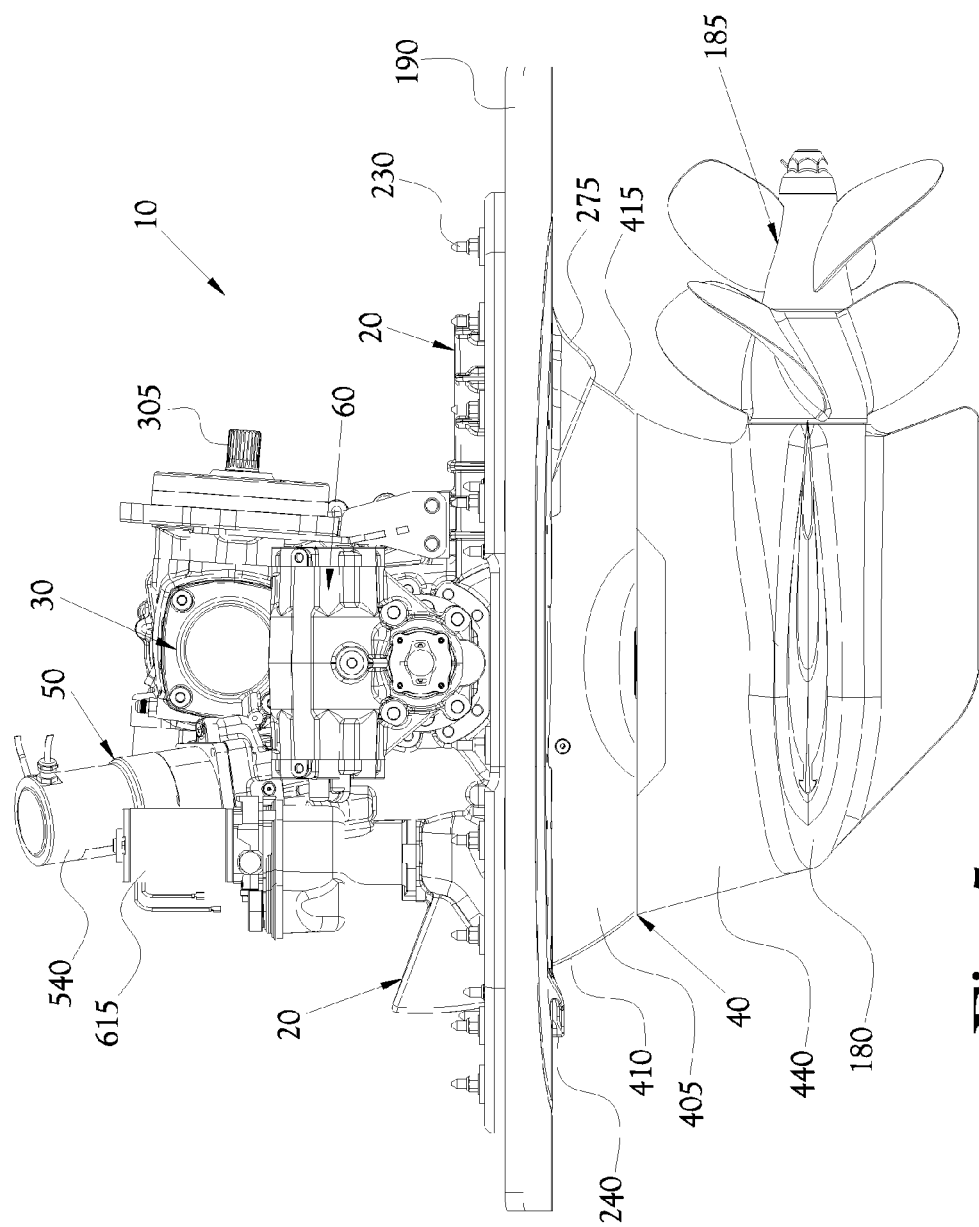
FIG. 5 is a left side elevation view of the marine drive illustrated in FIG. 2.
Figure 6:
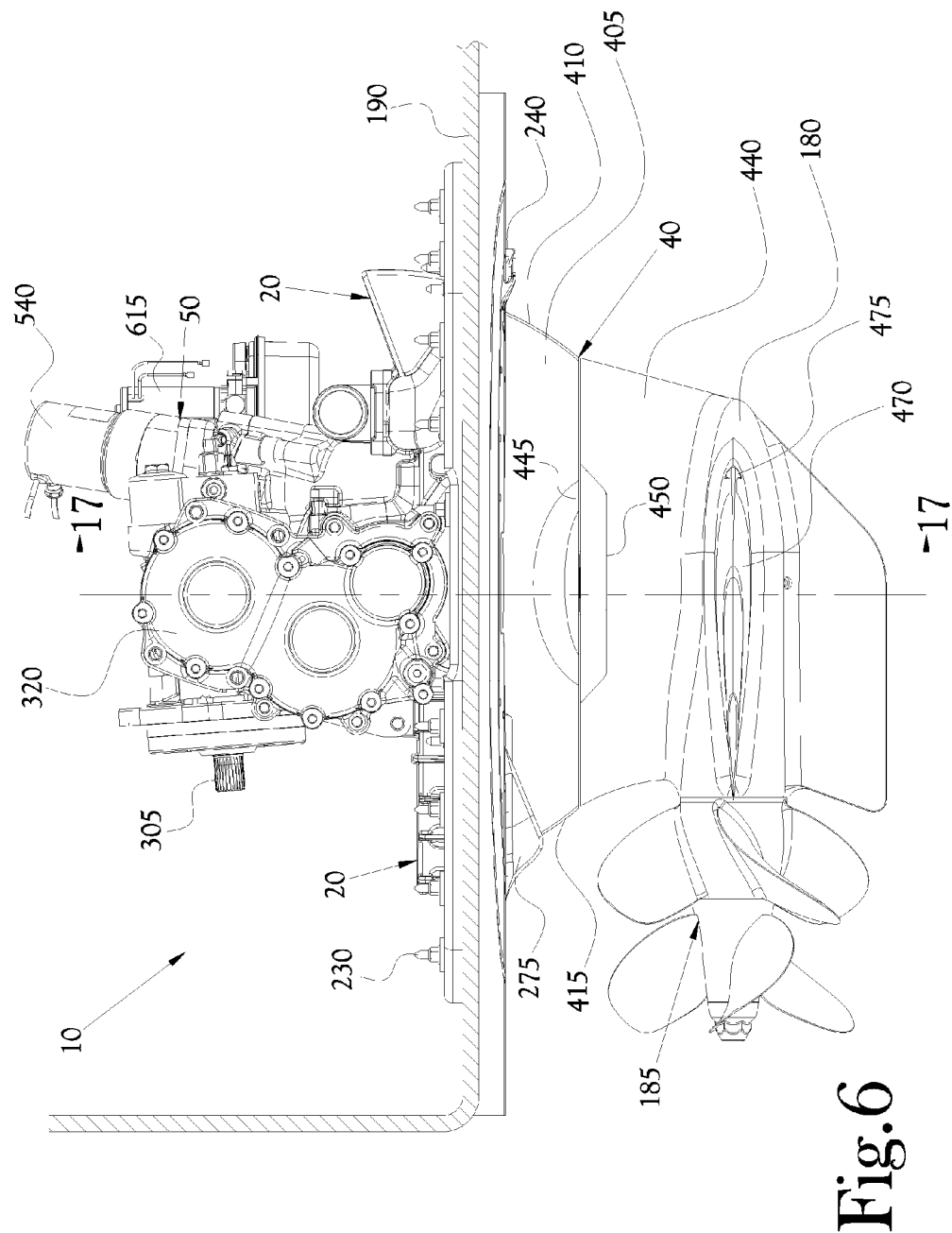
FIG. 6 is a right side elevation view of the marine drive illustrated in FIG. 2.
Figure 7:
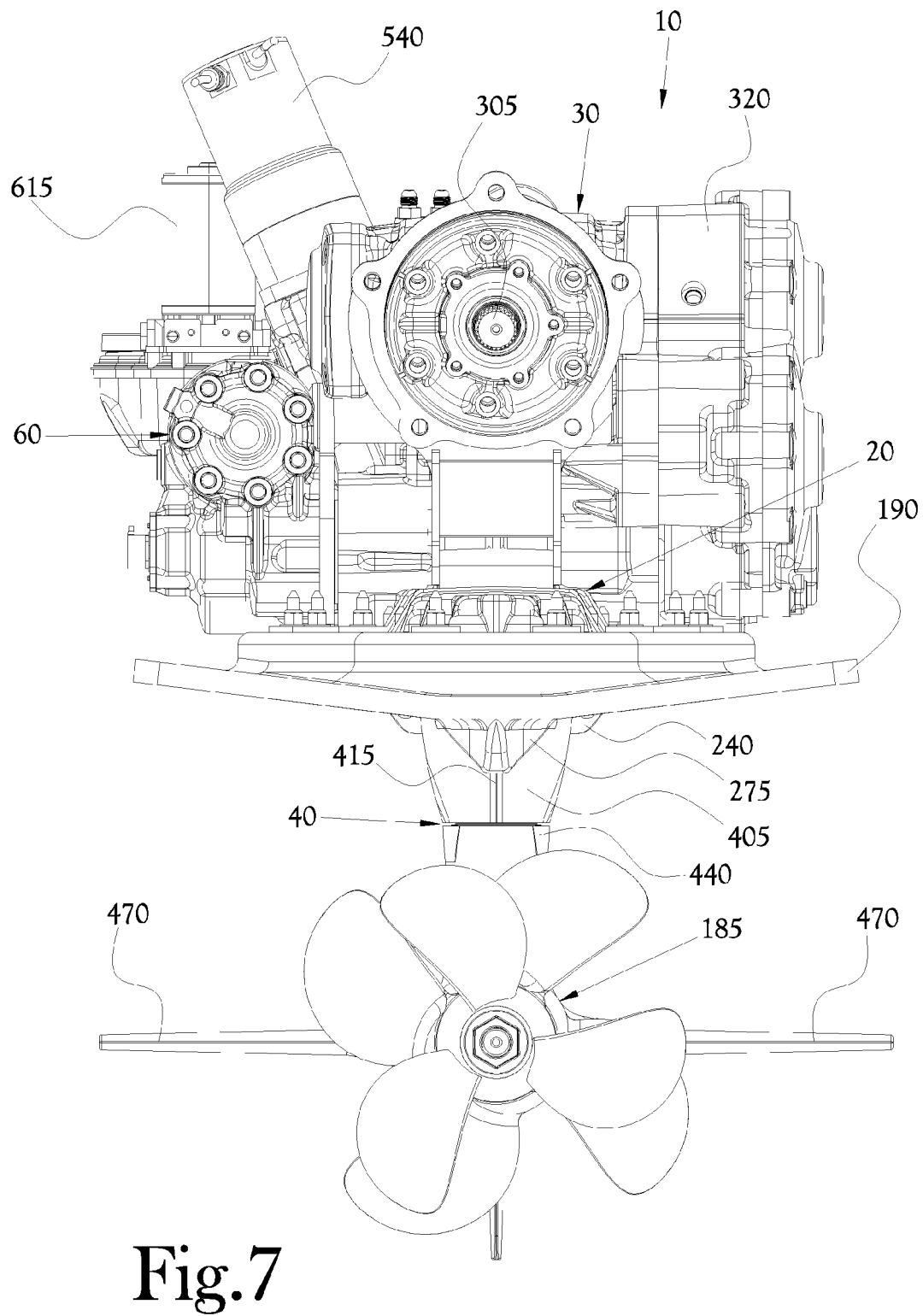
FIG. 7 is a rear elevation view of the marine drive illustrated in FIG. 2.
Figure 8:
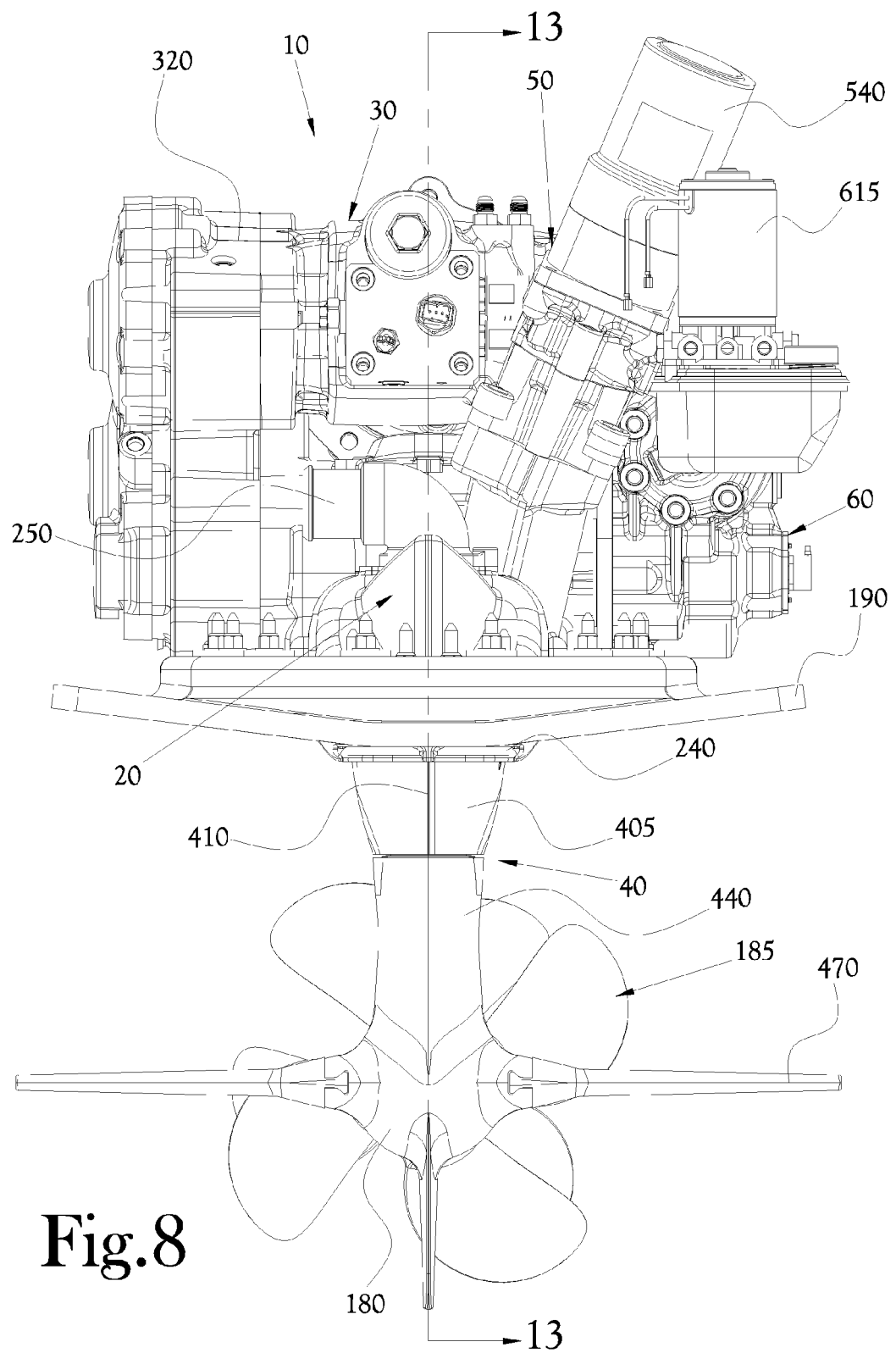
FIG. 8 is a front elevation view of the marine drive illustrated in FIG. 2.
Figure 9:
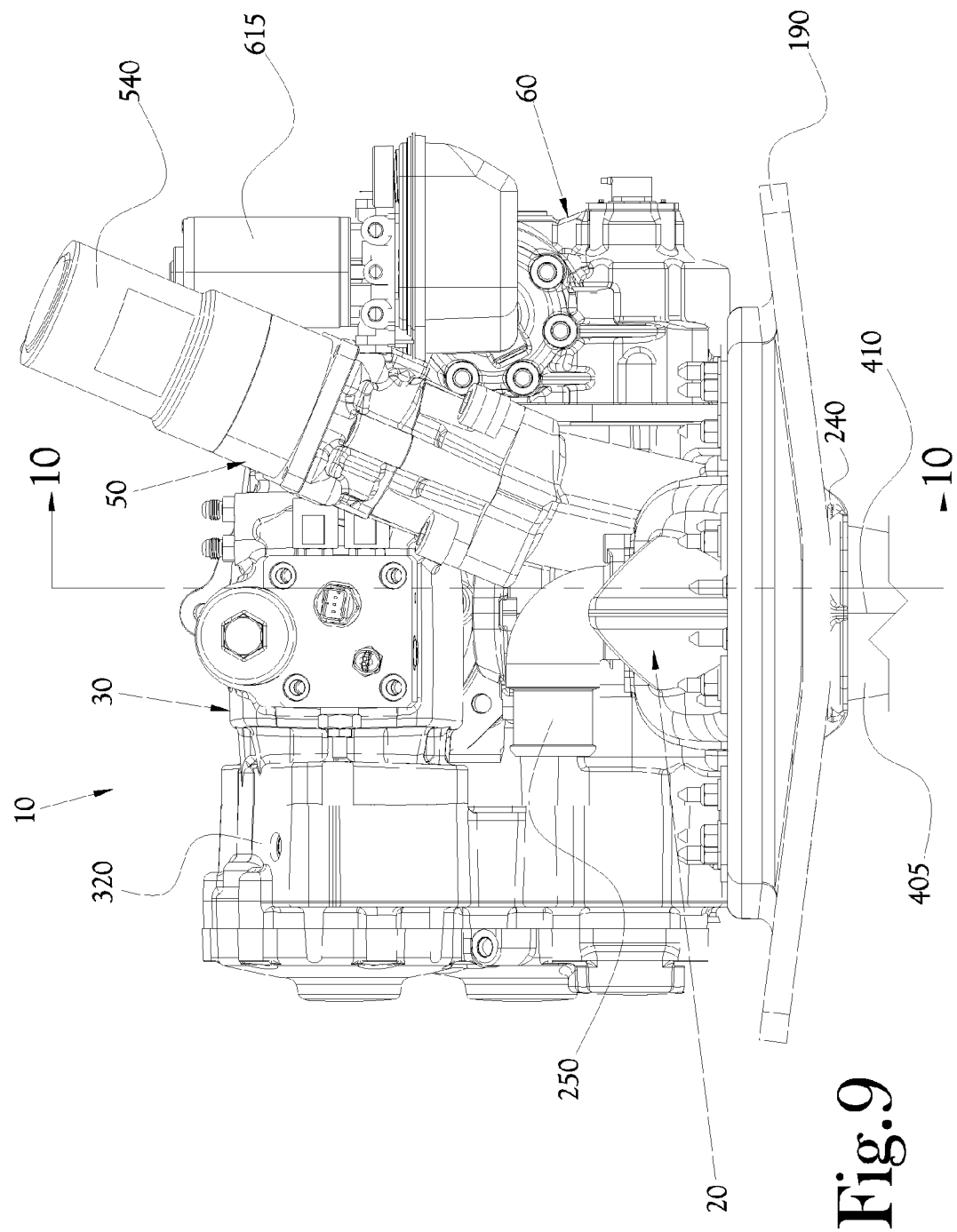
FIG. 9 is a close-up front elevation view of the marine drive illustrated in FIG. 2.

Referring now to FIGS. 1-10, the hull mounted, steerable marine drive system having trim actuation of the present invention, referred to herein as marine drive system, referenced generally as 10 in the figures, is illustrated in various views. Marine drive system 10 is both steerable through 360 degrees and is trimmable in a range of from approximately +3 degrees to approximately –15 degrees. Marine drive system 10, in the preferred embodiment, includes several sub-assemblies, each of which will be described in greater detail herein below, including an enclosure assembly 20 for sealing the hull and which is adapted for keeping much of the marine drive system from being exposed to water. The enclosure assembly 20 also enhances the hydrodynamic and wake performance of the boat over the known art. Further, marine drive system 10 includes a forward-neutral-reverse (FNR) transmission assembly 30, a drive unit assembly 40, a steering actuator assembly 50, a trim actuator assembly 60, and, in the preferred embodiment, a breakaway detachment system that protects the components above the hull in the event of a significant collision with a submerged object.

While each of these subassemblies will be described in greater detail herein below, it will be appreciated by those skilled in the art that with regard to marine drive system 10, the FNR transmission assembly 30 receives rotational drive forces from a motor, such as motor 115 in the figures, and delivers it to the propeller(s) 185, through the drive unit assembly 40. Those skilled in the art will recognize that many motor configurations are used in both state-of-the-art inboard drives and V-drives. Marine drive system 10 is adapted to be bolted directly to these traditional marinized motors. In this regard, those skilled in the art will recognize that in inboard drive and V-drive systems, it is common to use a marinized small block car/truck motor. Further, marinized motors, such as motor 115 illustrated in FIG. 1, could be either gas, diesel, or electric powered. In the preferred embodiment, the main vertical drive shaft 125, which is concentric with the steering axis of rotation 150, passes through the main trunnion housing 130. In the preferred embodiment, trunnion housing 130 is concentric with the axis of trim rotation 160. Trunnion housing 130 provides a mounting point for the trim actuator assembly 60. The main drive shaft 125 passes through the steering shaft 140 which is preferably concentric with the steering axis 150 to propeller gears located in a torpedo-shaped propeller shaft housing 180 supporting counter-rotating propellers 185. The propulsion system in illustrated in FIG. 1 is shown in a substantially neutral trim and substantially neutral steering rotation plane angle. Enclosure assembly 20 also serves as a mounting point for vertical gear box 320, various components of the trim actuator assembly 60, and trunnion bearings, also referred to as the trunnion hub, for trimming the upper unit.

The Enclosure:

The enclosure assembly 20 provides an interface between the upper unit 405 and the hull 190 of the boat without negatively impacting wake performance behind the boat. A fairing defined by enclosure assembly 20, previously referred to as "the doghouse", can be box-shaped, but in the preferred embodiment has a low profile, closely conforming to the components contained therein. Enclosure assembly 20 is disposed just within the hull 190 of a boat and includes an upper portion 200. The enclosure assembly 20 incorporates a gasket flange plate 205 that closely follows the contour of an upper unit 405 and provides for a virtually seamless interface to the boat hull 190. While the junction between the gasket flange plate 205 and the upper unit is not necessarily watertight, the junction between the gasket flange plate 205 and the hull 190, in the preferred embodiment is substantially watertight. In this regard, the junction between the enclosure assembly 20 and the hull is watertight and is sealed such that water cannot enter the boat. It will be appreciated by those skilled in the art that if one desired a substantially watertight junction between the gasket flange plate 205 and the upper unit 405, a gasket (not shown) could be incorporated with the gasket flange plate 205 at the junction between the gasket flange plate 205 and the upper unit 405.

In this regard, as best illustrated in FIGS. 10A, 10B, 11, 13A and 17, the gasket flange plate 205, which includes a gasket flange 210. The gasket flange 210, in the preferred embodiment, extends radially outward. The gasket flange plate 205 is sealed against the hull by means of a retention plate 220. A folded O-ring gasket 225 is disposed between the retention plate 220 and the gasket flange 210. Further, folded O-ring gasket 225 is also disposed between the gasket flange 210 and the hull 190. In the preferred embodiment, the folded gasket 225 is formed from a resiliently compressible material and has a C-shaped cross section. This assembly is covered by a split shroud plate 260 that is secured to the gasket flange plate 205. The split shroud plate 260 creates a smooth transition to the boat hull 190 and the edge of the upper unit 405 to preserve the boat's hydrodynamic shape and wake performance. The split shroud plate 260 and the retention plate 220, as will be appreciated by those skilled in the art, can be made with a custom contour that best matches the hull shape and transition to the edge of the upper unit 405. Further, it should be appreciated that while split shroud plate 260 and the gasket flange plate 205 are described and illustrated as being separate components, the split shroud plate 260 and the gasket flange plate 205 could be integral.

Figure 11:
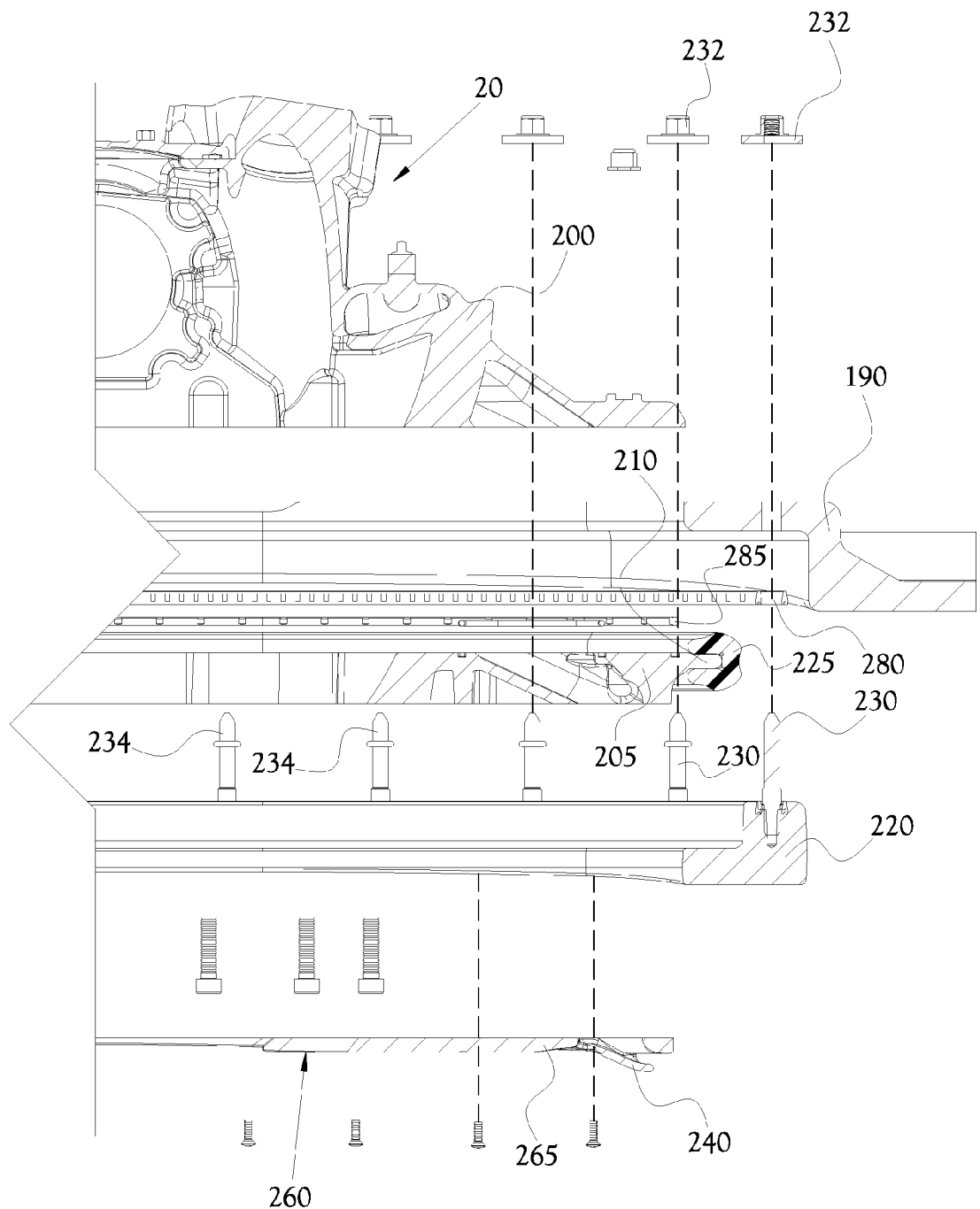
FIG. 11 is an exploded, cross-sectional view of the enclosure assembly.

As most clearly seen in FIGS. 10A, 10B, and 11, the upper portion 200 of the enclosure assembly 20 is secured to the gasket flange plate 205 by a plurality of bolts 235. The retention plate 220 is secured to the hull 190, in combination with folded gasket 225 secures or retains the gasket flange plate 205 such that folded gasket 225 creates a substantially waterproof seal between the junction of retention plate 220 and flange 210 and between the junction of flange 210 and hull 190. Further retention plate 220 is secured to the hull by a plurality of bolts 235. Gasket 280 further seals the junction between retention plate 220 and hull 190. Additionally, gasket 285 further seals the junction between the gasket flange plate 205 and the upper portion 200 of the enclosure assembly 20. Those skilled in the art will recognize that it may be desirable to provide o-rings, such as o-rings 234 for each of bolts 230 and bolts 235.

It will be recognized and appreciated by those skilled in the art that marinized small-block car/light truck motors, such as motor 115, are water cooled motors. In order to draw raw water, whether the motor 115 has a raw water cooling system or an enclosed system, in the preferred embodiment, the fore portion 265 of the split shroud plate 260 is provided with at least one, and preferably two, water pickup inlets 240 in fluid communication with a water outlet 250 which can be connected by a hose, as is well known in the art, with the motor 115 for cooling the motor while in operation.

Figure 13A:
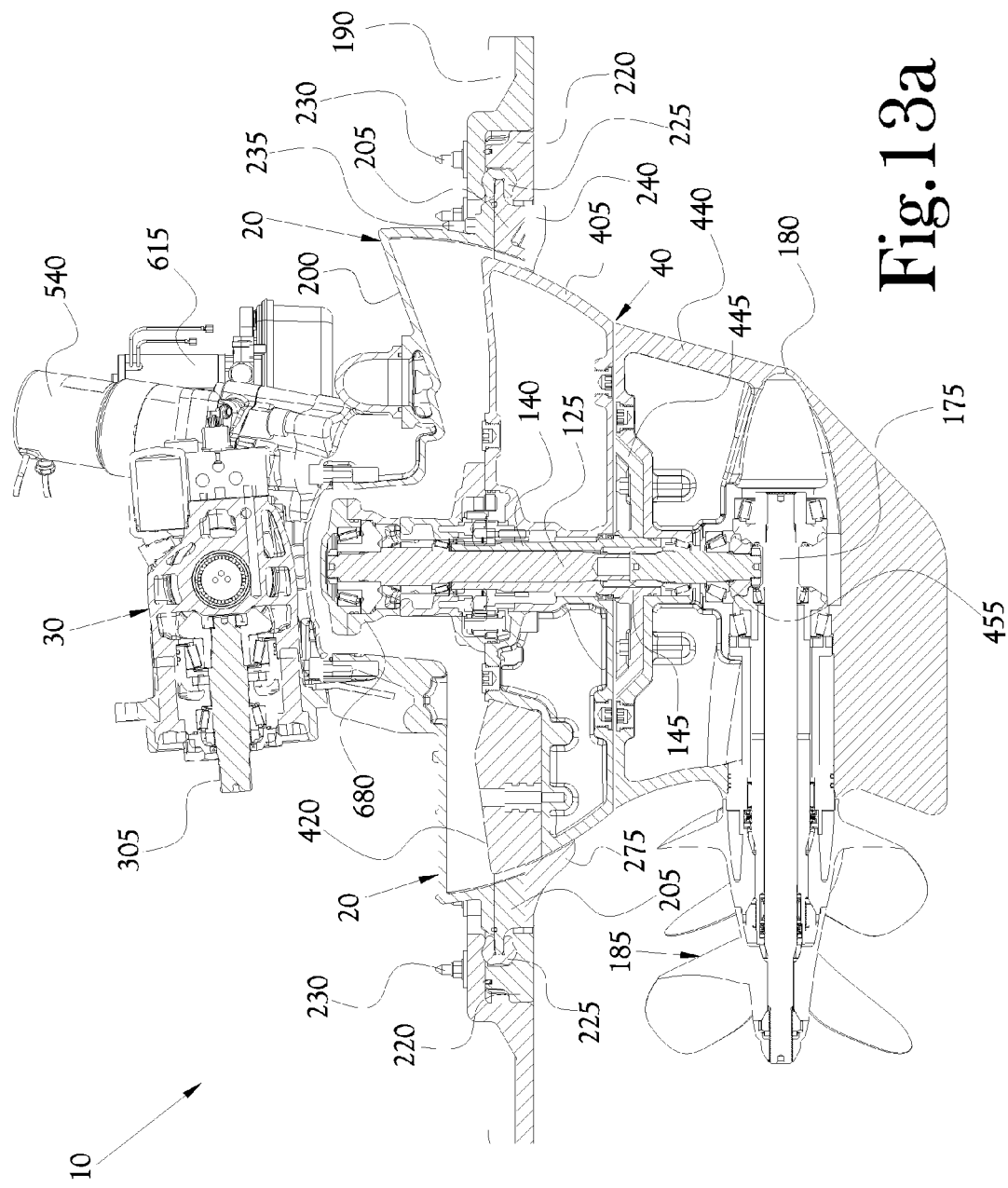
FIGS. 13A, 13B, and 13C are cross-section views taken at cut-line 13 in FIG. 8 showing the range of trim of the drive unit of the marine drive of the present invention.
Figure 13B:
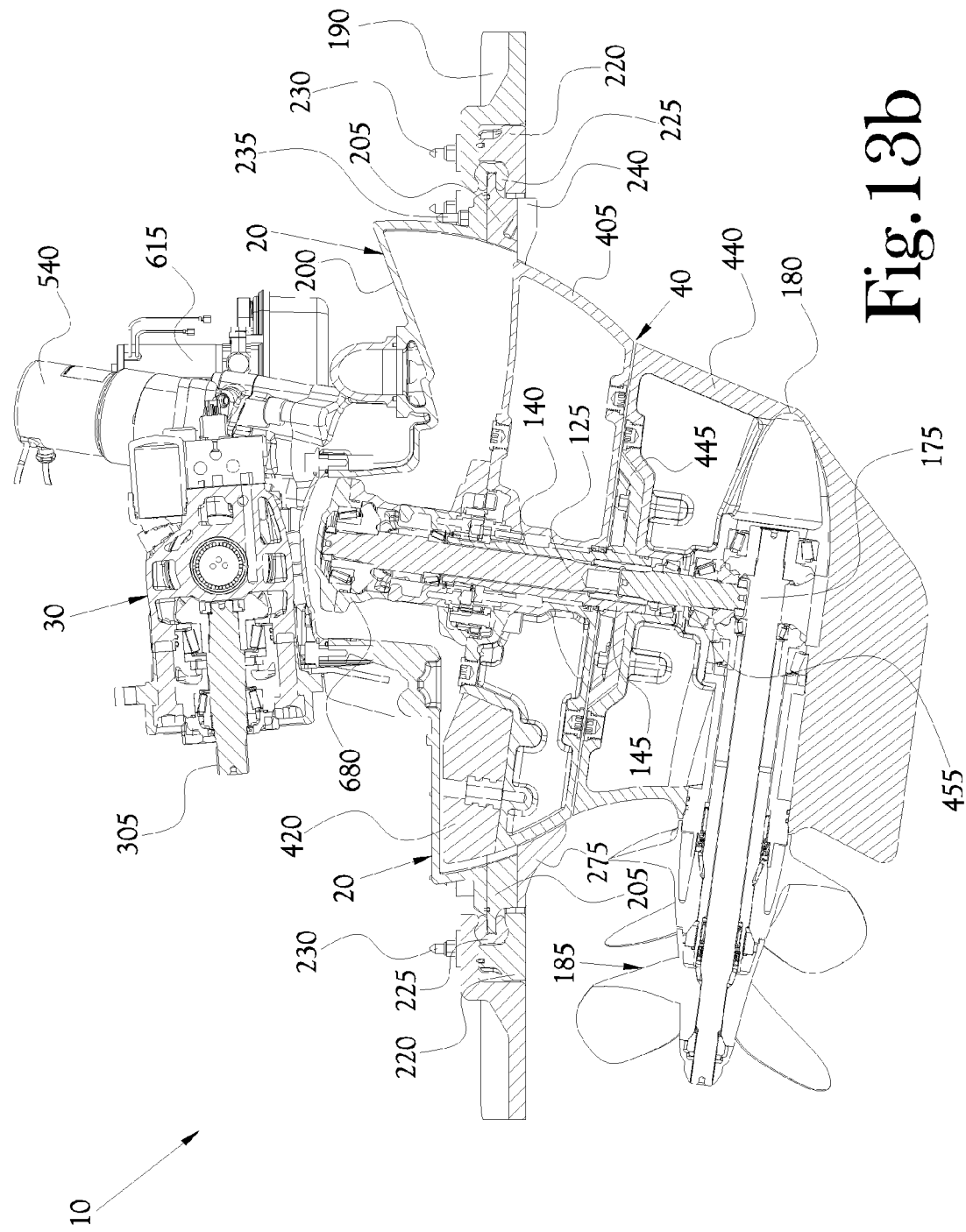
Figure 13C:
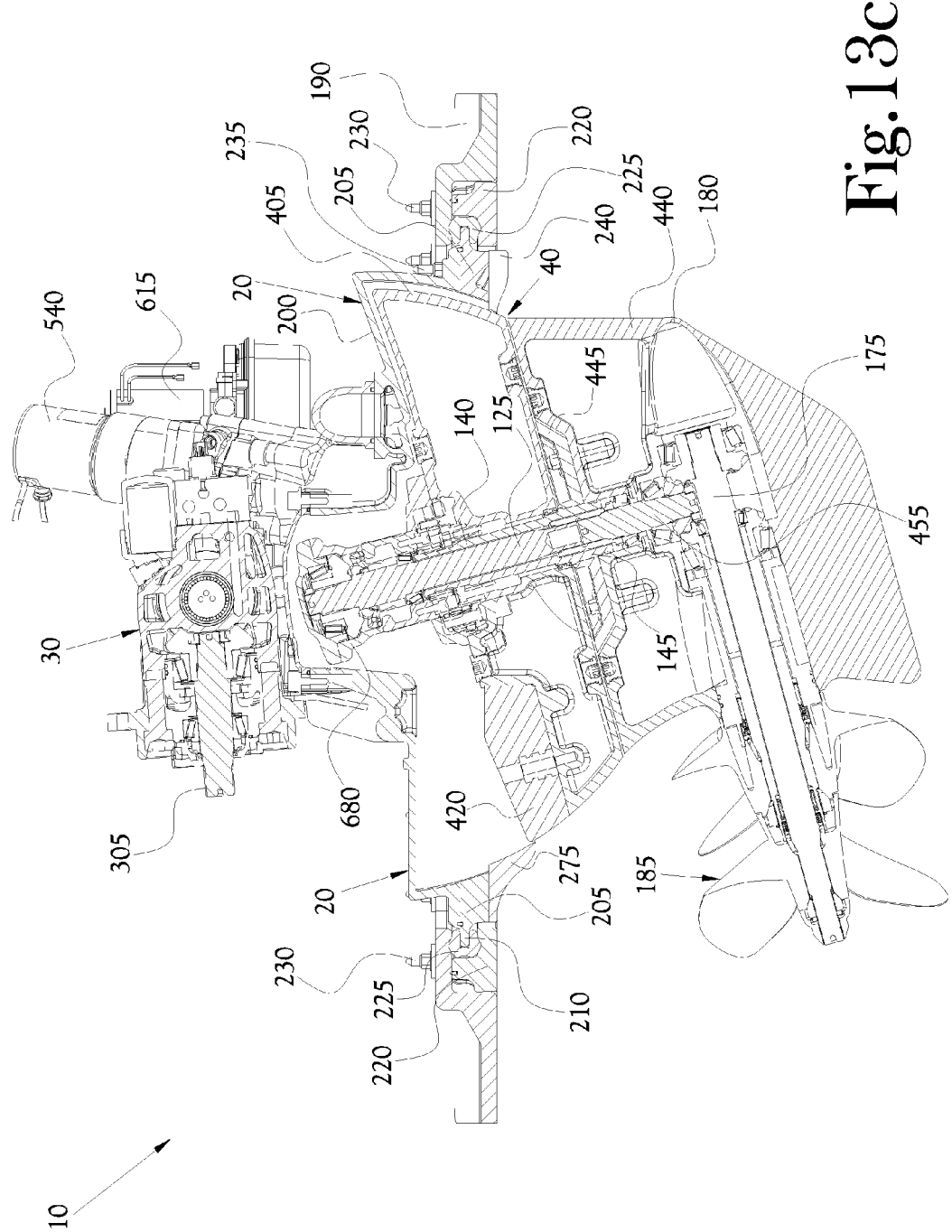

Referring to FIGS. 13A, 13B, and 13C, it will be recognized that in order to maintain a very low profile the aft end of the upper unit 405 has a height such when the upper unit is trimmed to the maximum −15 degrees of trim, the aft end of the upper unit drops below the hull. This can allow water to swirl into the portion of the enclosure assembly 20 that covers the aft end of the upper unit 405 resulting in a loss of hydrodynamic efficiency and wake performance. In order to prevent this, in the preferred embodiment, the aft end 270 of the split shroud 260 includes a shroud 275 to enclose trailing edge 415 of upper unit 405. This shroud 275 substantially prevents water from entering the enclosure when the upper unit is trimmed to the maximum −15 degrees of trim thereby preserving the hydrodynamic efficiency and wake performance of the marine drive system 10. Moreover, this feature allows the trailing edge 415 of the upper unit 405 to be smaller thereby allowing the motor 115 to sit lower in the hull while retaining a full −15 degrees of trim angle.

Figure 17:
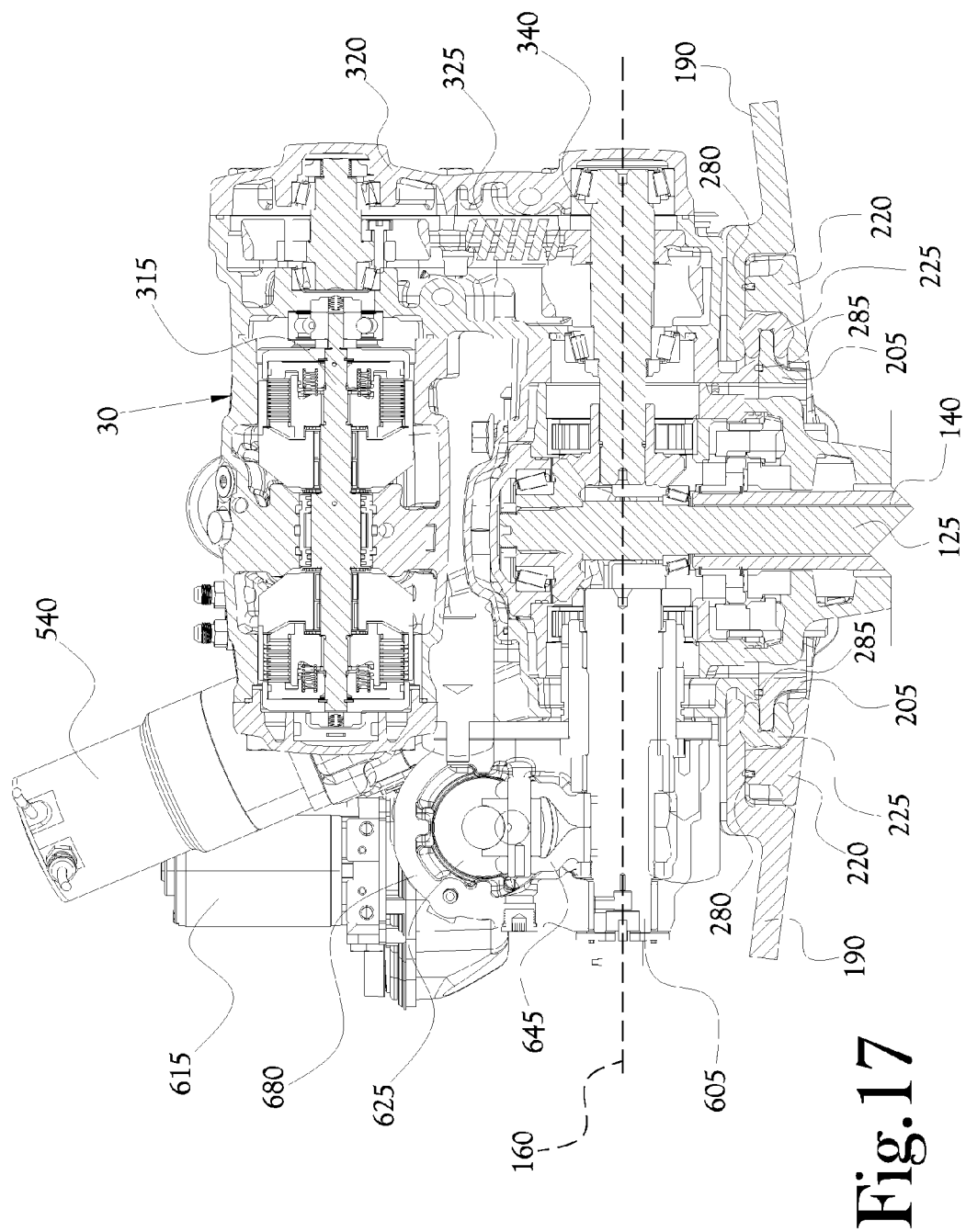
FIG. 17 is a cross-sectional view of the marine drive of the present invention taken at cut-line 17 in FIG. 6.

FNR Transmission:

Those skilled in the art will recognize and appreciate that it is not only "traditional" for the engine and drive unit to be positioned on a common central line along the direction of thrust, but this arrangement also allows for certain efficiencies of space utilization in marine vessel design. In order to accomplish this positioning, in accordance with the teaching of the present invention, a horizontal, transversely mounted FNR transmission 30 includes an input shaft 305 for receiving rotational movement from motor 115. The FNR transmission, in the manner readily understood in the art, is shiftable between forward, neutral, and reverse. FNR transmission 30 includes a transmission output shaft 315. The transmission output shaft 315 engages the vertical gear box 320. As best illustrated in FIG. 17, the vertical gear box 320 houses at least a pair of gears 325, and in the illustrated embodiment, three gears 325, one of which is carried by the vertical gear box output shaft 340. The vertical gear box output shaft 340 engages the main vertical drive shaft 125. While in the preferred embodiment, the vertical gear box 320 is gear driven, those skilled in the art will recognize that a vertical gear box that was belt, chain, or shaft driven could also be utilized.

While in the illustrated embodiment, the motor 115 is disposed aft, or astern, of marine drive system 10, it will be appreciated that in certain installations, it may be desirable to mount the motor 115 forward of the marine drive system 10. In order to accommodate such an arrangement, the FNR Transmission is adapted such that it can be unbolted and rotated 180 degrees in order to allow motor 115 to be mounted forward of the marine drive system 10.

Figure 23:
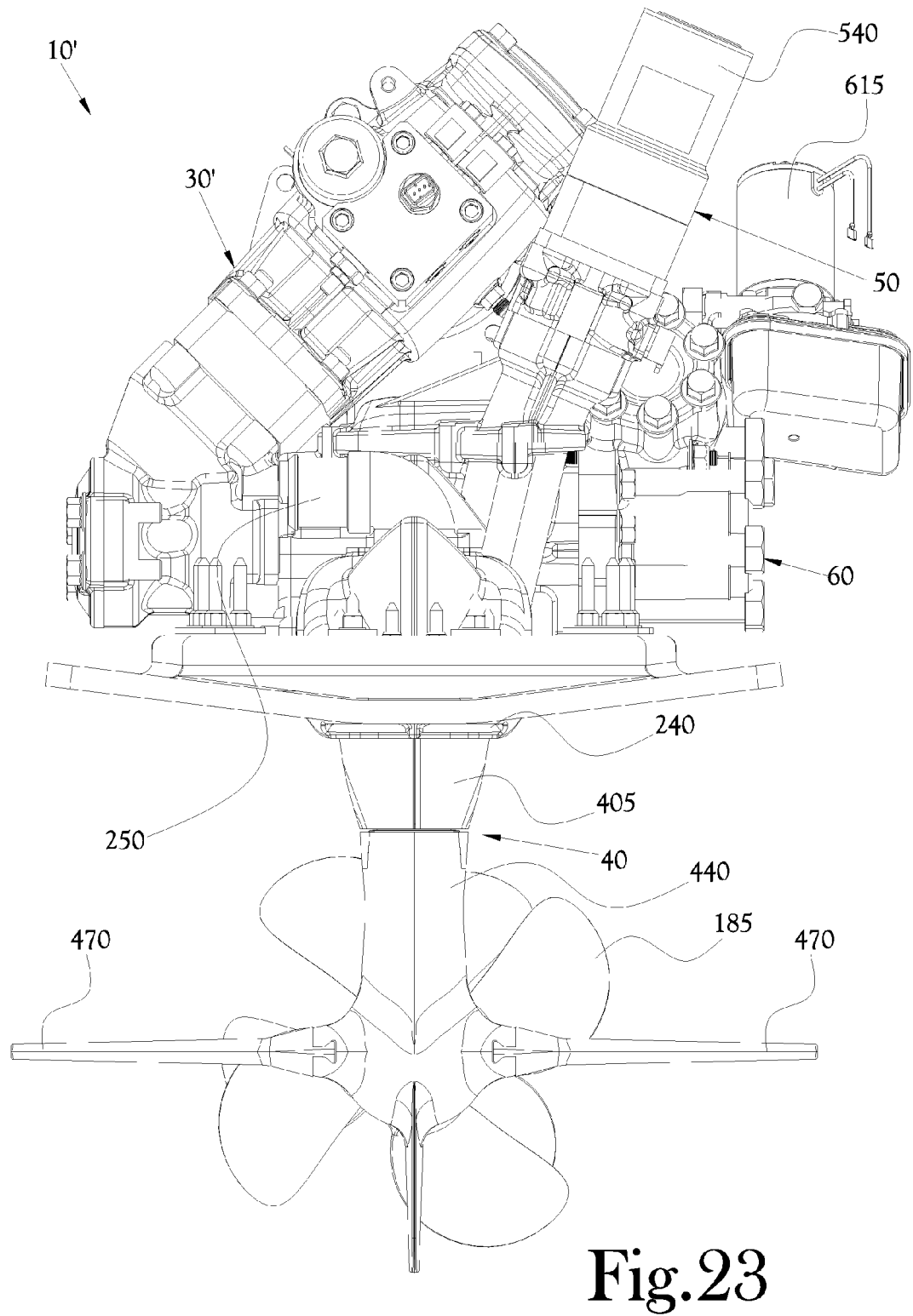
FIG. 23 is a front elevation view of an alternate embodiment of the hull mounted, steerable marine drive with trim actuation of the present invention.

In an alternate embodiment, illustrated in FIG. 23, a marine drive system 10' incorporate a FNR transmission 30' mounted at an approximate 45° angle and could receive power from a center-line mounted motor and have a transmission output shaft that delivers rotational drive forces to a horizontal drive shaft, such as vertical gear box output shaft 340, which in turn delivers rotational drive forces to the main vertical drive shaft 125. A 45-degree FNR transmission 30' eliminates the need for a vertical gear box 320 and still allows for drive forces to come directly from above, and fore or aft of the marine drive system 10'.

Drive Unit Assembly:

In the preferred embodiment, the drive unit assembly 40 is comprised of three main sub-assemblies: the upper unit 405, the lower unit 440, and the torpedo-shaped propeller shaft housing 180 supporting propeller(s) 185. The upper unit 405 is trimmable. In this regard, as is described in greater detail below, upper unit 405 is engaged and acted upon by trim actuation assembly 60. The leading and trailing edges of the upper unit 405 will follow a constant radius measured from the center of the axis-of-trim 160. The shape is such that within a range of from approximately +3 degrees to approximately −15 degrees of rotation from level, the upper unit 405 maintains a close "fit" to the cooperating opening of the gasket flange plate 205 and split shroud plate 260.

The lower unit 440 is carried by the steering shaft 140 and is steerable through 360 degrees of steering. In this regard, as will be described in greater detail herein below, the steering shaft 140, and in turn the lower unit 440, is engaged and acted upon by steering actuation assembly 50. Thus, it will be appreciated that while the lower unit 440 cooperates with the upper unit 405, steering actuation is independent of trimming actuation. Stated another way, the lower unit 440 is steerable through 360 degrees of rotation while the upper unit is trimmed to any selected angle of trim from and including level.

Figure 12:
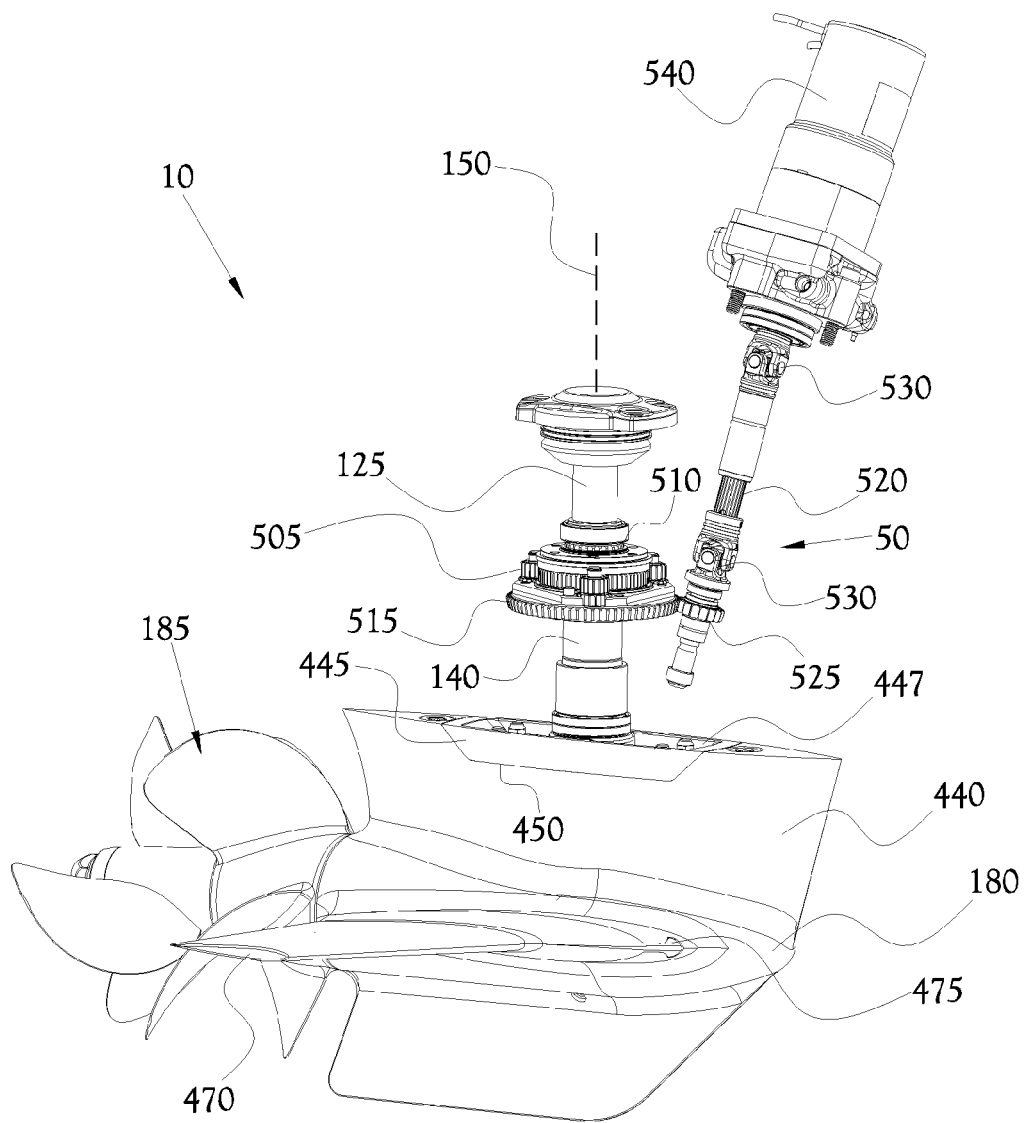
FIG. 12 is a right perspective view of the steering actuation assembly for the lower unit of the marine drive of the present invention with various components removed for clarity of view in order to illustrate the splined, articulating drive shaft and planetary gear system of the steering actuator.

As stated above, and as illustrated in FIG. 12, the lower unit 440 is carried by the steering shaft 140. In this regard, a coupling deck 445 is secured to the lower end 145 of steering shaft 140 by at least two, and preferably four, bolts 447. The coupling deck 445 is adapted to be received in a recessed portion 450 of the lower unit 440 and so as to be in line with and flush with the top surface of the lower unit 440. This allows for a minimal clearance between lower unit 440 and upper unit 405.

Figure 18:
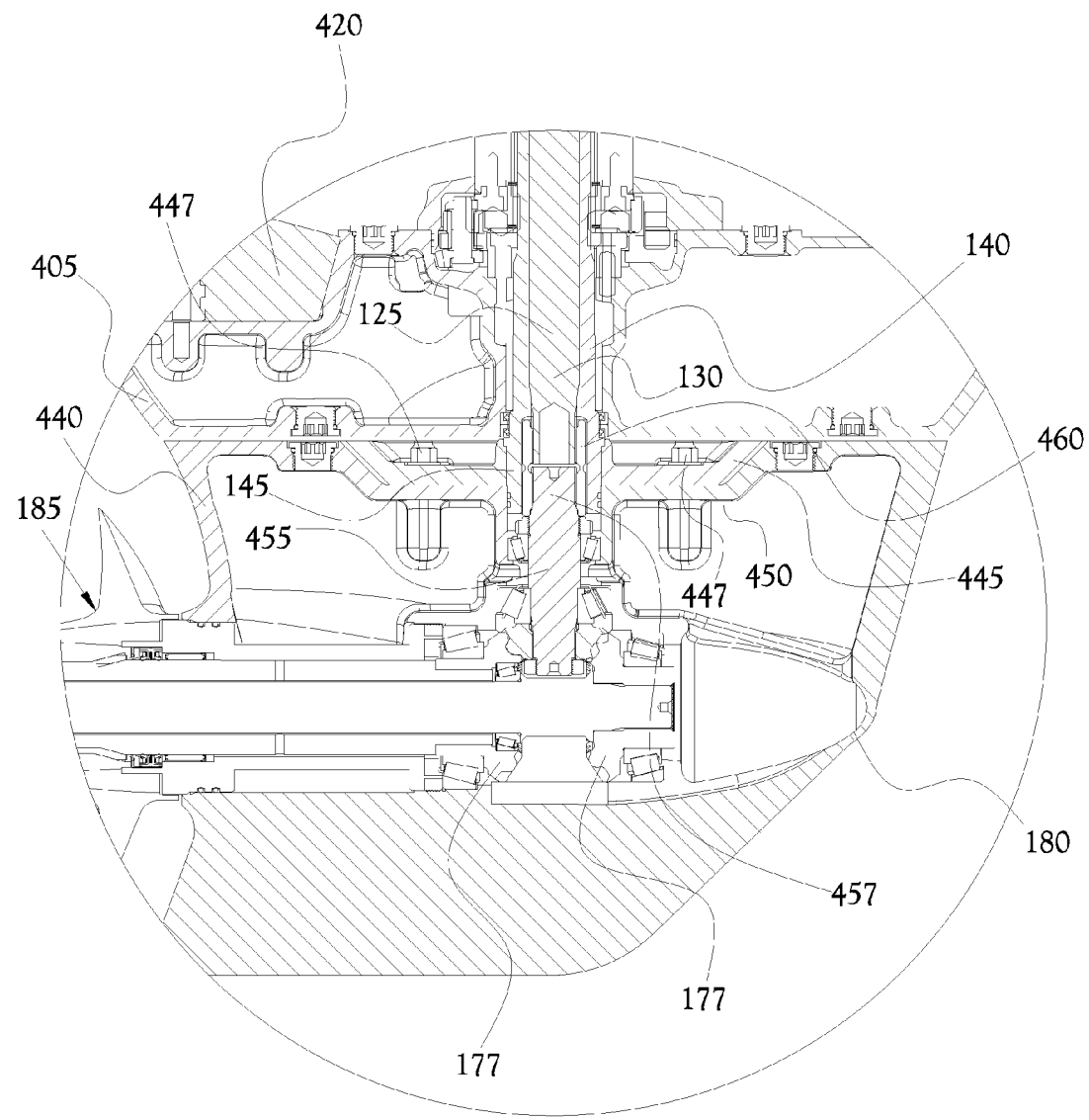
FIG. 18 is a close-up of the cross-sectional view of the lower unit of the marine drive illustrated in FIG. 13A showing the various break-away features for protecting the lower unit in the event of a collision with a submerged object.
Figure 19:
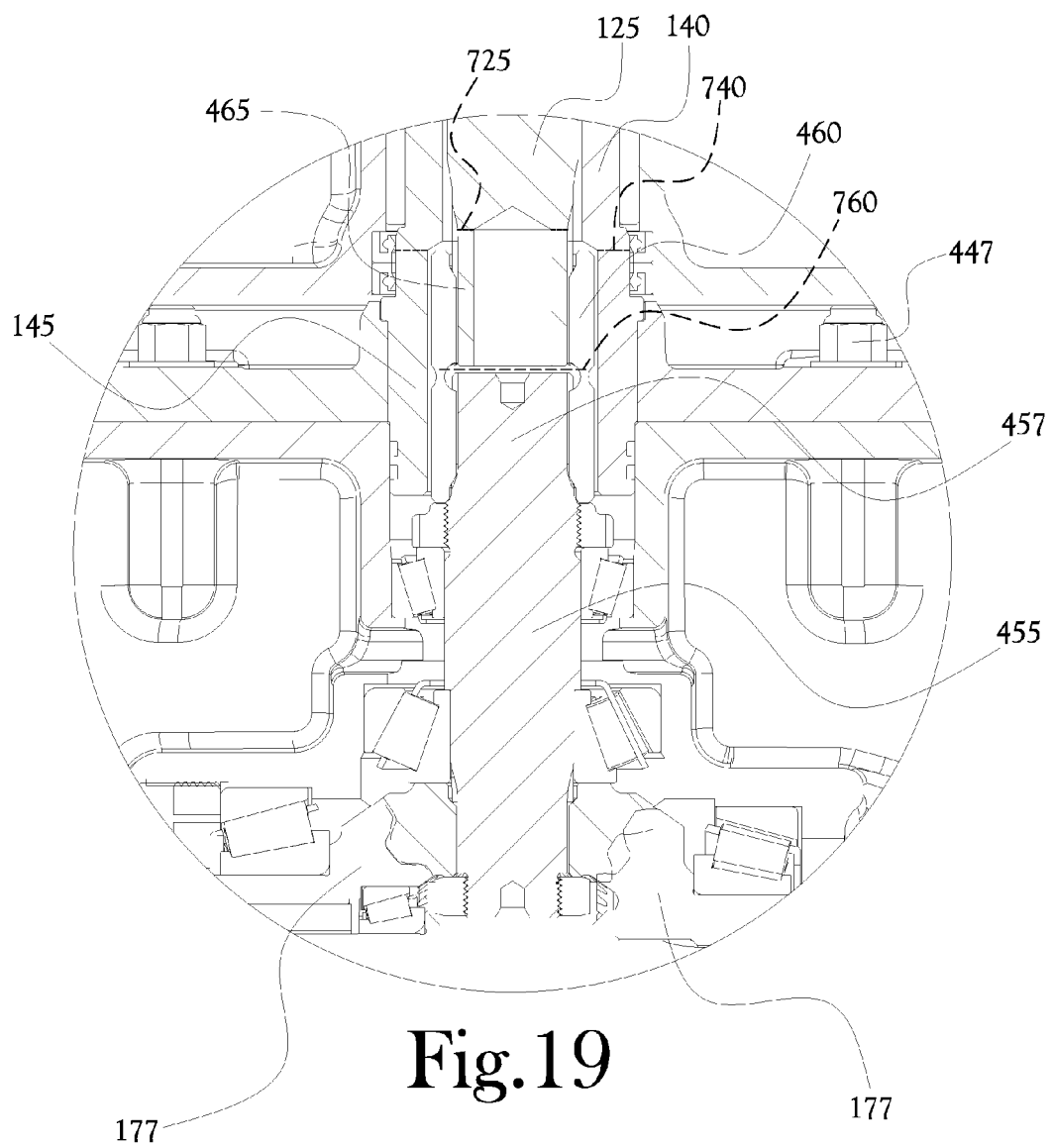
FIG. 19 is still a closer view of the cross-sectional view of the lower unit of the marine drive illustrated in FIG. 13A showing still an additional break-away feature for protecting the lower unit in the event of a collision with a submerged object.

Additionally, as most clearly illustrated in FIGS. 18 and 19, lower unit drive shaft 455 is secured to the lower end 130 of vertical drive shaft 125 by means of an internally grooved coupling sleeve 460 and a shaft gear 465. In this regard, in the preferred embodiment, the lower end 130 of vertical drive shaft 125 and the upper end 457 of lower unit vertical drive shaft 455 are splined and mate with the internally grooved coupling sleeve 460. In this manner lower unit drive shaft 455 becomes an extension of vertical drive shaft 125 for delivering rotational movement to the propeller shaft 175. It will be understood that bevel gears 177 transfer rotational movement from the vertical drive shaft 125 to the horizontal propeller shaft 175.

As stated above, the lower unit 440 of drive unit assembly 40 includes the torpedo-shaped propeller shaft housing 180 which supports the propeller shaft 175 and the propeller(s) 185. While the lower unit 440 of the present invention could drive a single propeller, those skilled in the art will appreciate that due to efficiencies inherent in a counter-rotating propeller system, in the preferred, illustrated embodiment, the torpedo-shaped propeller shaft housing 180 supports counter-rotating props 185.

In order to improve the effectiveness of trim at any angle of trim, i.e. in the full range of positive and negative trim described herein, trim foils 470 are mounted to the torpedo-shaped propeller shaft housing 180. Trim foils 470 provide enhanced lift at a given angle of attack. In other words, trim foils 470 provide for greater trim lift and reduce the angle of attack necessary for a given amount of lift, thereby greatly increasing the fuel efficiency of the marine drive system 10. In this regard, those skilled in the art will recognize that at any given trim angle, the total thrust of the counter-rotating props 185 can be divided into a horizontal thrust vector and a vertical lift vector. By reducing the angle of attack required to achieve a given level of trim in order to get the vessel "up on plane", the amount of thrust given over to the vertical thrust vector is reduced, thereby increasing, or preserving the amount of thrust given to the horizontal thrust vector. In the preferred embodiment, the trim foils are mounted to the torpedo-shaped propeller shaft housing by means of a dovetail mount 475. Further, in order to prevent tip vortices generated by a foil, such as trim foils 470, when lift is being generated from interfering with the hydrodynamic efficiency of props 185, the length of the individual trim foils 470 should be chosen to extend beyond the radius of the props 185.

In addition to the advantages already discussed, an additional advantage from this combination of the enclosure assembly 20 and the drive unit assembly 40 is that the marine drive system 10 of the present invention allows the entire drive unit assembly 40 including motor 115, absent props 185 and the trim foils 470, to be installed from the top through the hull 190 as a single unit. The gasket flange plate 205, retention plate 220, and split shroud plate 260 are then secured, as discussed herein, securing the marine drive system 10 to the hull 190 of the vessel. Then, the props 185 and the trim foils 470 are attached to the lower unit 440 after the drive unit assembly 40 has been lowered through, and secured to, the hull 190.

Further, the upper unit 405 of the drive unit assembly 40 is shaped in the horizontal plane using a tapered leading edge 410 and tapered trailing edge 415 as is typical in marine applications. In the preferred embodiment, this shape will be constant in the radial direction for a distanced needed to accommodate movement for trim angle adjustment. The shape of the lower unit 440 will maintain a shape consistent with the upper unit 405 making for a smooth transition at the steering plane. This configuration is particularly useful for applications where vessel speed is greater than thirty miles per hour, and/or in applications where wake performance behind the vessel is highly desirable, such as for skiing, surfing, or wake boarding.

Steering Actuator:

As illustrated in FIG. 12, in the present embodiment, marine drive unit 10 features an improved steering actuation assembly 50 that utilizes a planetary gear set 505 to deliver rotational motion to the steering shaft 140. In this regard, steering forces are transferred to the lower unit 440 by steering shaft 140 as will be described herein below. At its upper or distal end, steering shaft 140 carries a gear member that defines the sun gear 510 of planetary gear set 505. The ring gear 515 of planetary gear set 505 is also externally geared and is in meshing communication with the terminal end 525 of an articulating, splined drive shaft 520. In order to compensate for the tilting motion of planetary gear set 505 and allow the steering shaft 140 to move as the upper unit is trimmed, while maintaining the geared communication of the ring gear 515 with the geared terminal end 525 of the splined drive shaft 520, splined drive shaft 520 is provided with upper and lower U-joints 530. This combination of the splined drive shaft 520 having upper and lower U-joints 530 allows the actuator motor 540 to be fixed on the outside of the enclosure assembly 20, within the hull of the boat, and, thus, not exposed to being submerged in water. As the planetary gear set 505 travels with the upper unit 405 thru the full range of trim motion described herein, the geared terminal end 525 can follow the planetary gear set 505 thus allowing the splined drive shaft 520 to continue to translate steering forces from the fixed steering actuator motor 540.

Further, the planetary gear set 505 allows for significant gear reduction to offset steering forces without using excessively large reduction gears. The planetary gear set 505 allows for a very compact solution to achieve the much needed gear reduction. In the present, preferred, embodiment, steering actuator assembly 50 of marine drive unit 10 utilizes a state of the art electric actuator 540 under processor control, and fixed on the outside of enclosure assembly 20 and away from any water. In the absence of processor control of electric actuator 540, the steering actuator assembly 50 could be cable actuated, hydraulically actuated, or direct actuated as desired.

Figure 14:
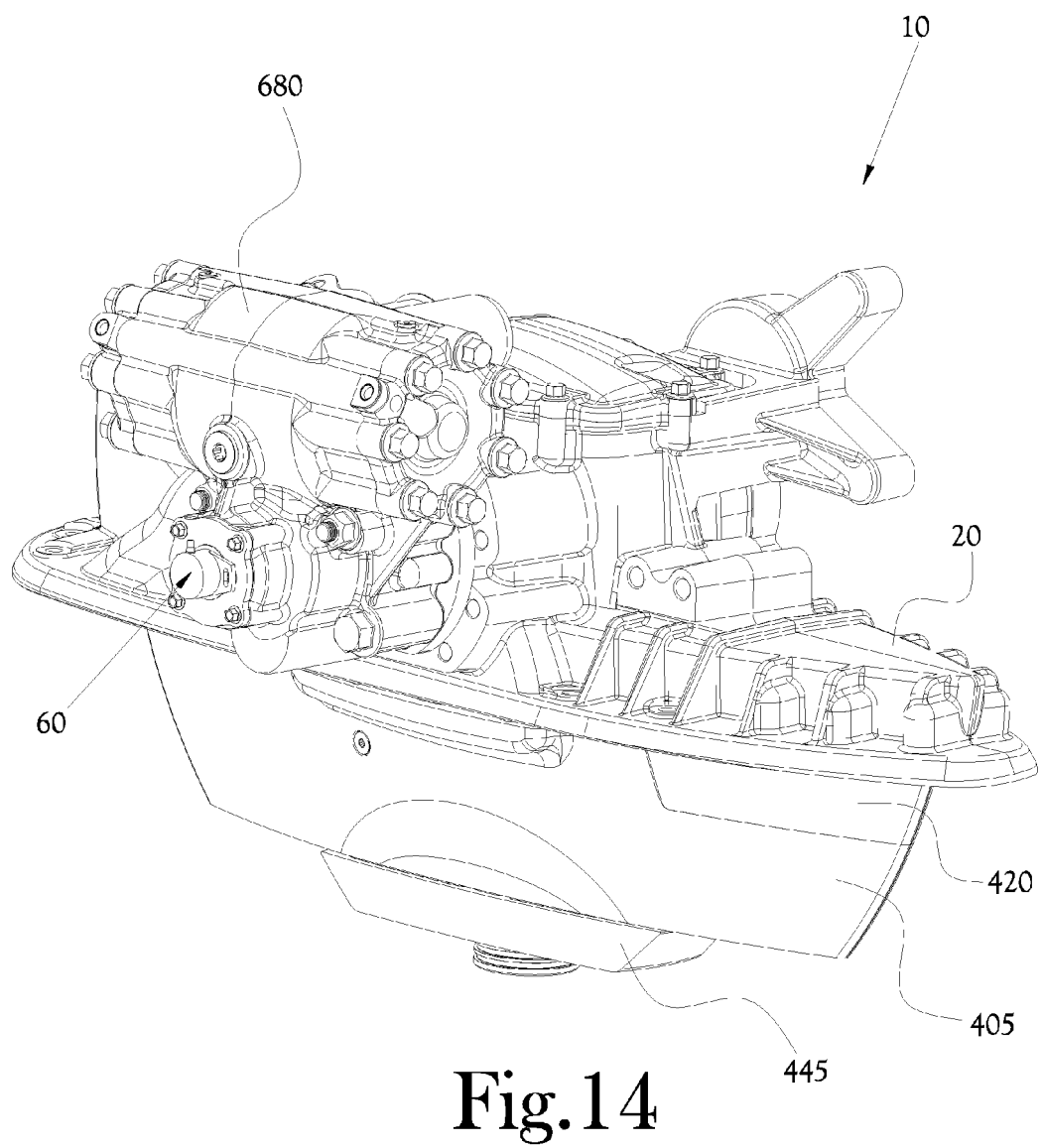
FIG. 14 is a left side perspective view of the marine drive illustrated in FIG. 2 with various components removed for clarity of view to show the construction and function of the trim actuator assembly for trimming the upper unit of the marine drive of the present invention.
Figure 15:
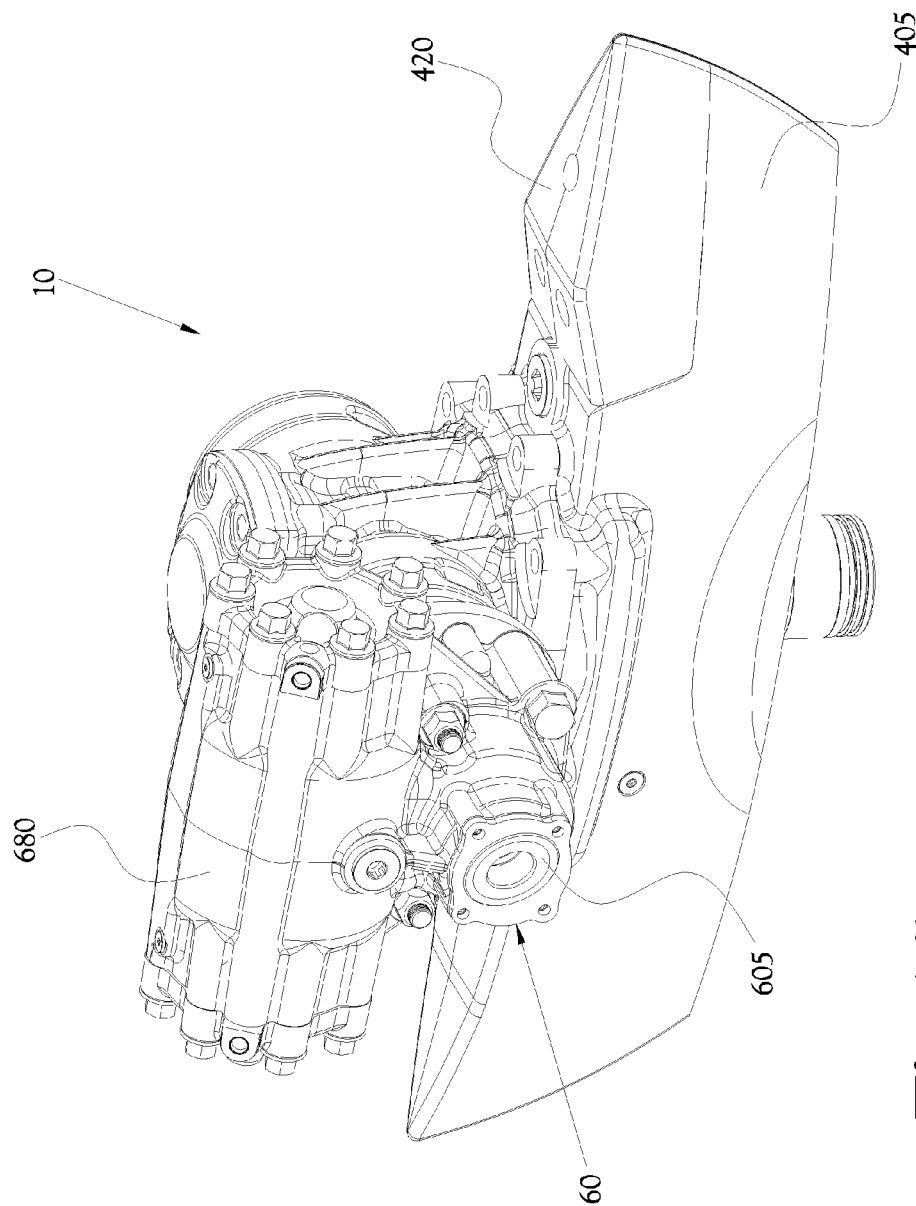
FIG. 15 is a left side perspective view of the trim actuator assembly illustrated in FIG. 14 with still additional components removed for clarity of view to show the construction and function of the trim actuator assembly for trimming the upper unit of the marine drive of the present invention.
Figure 16:
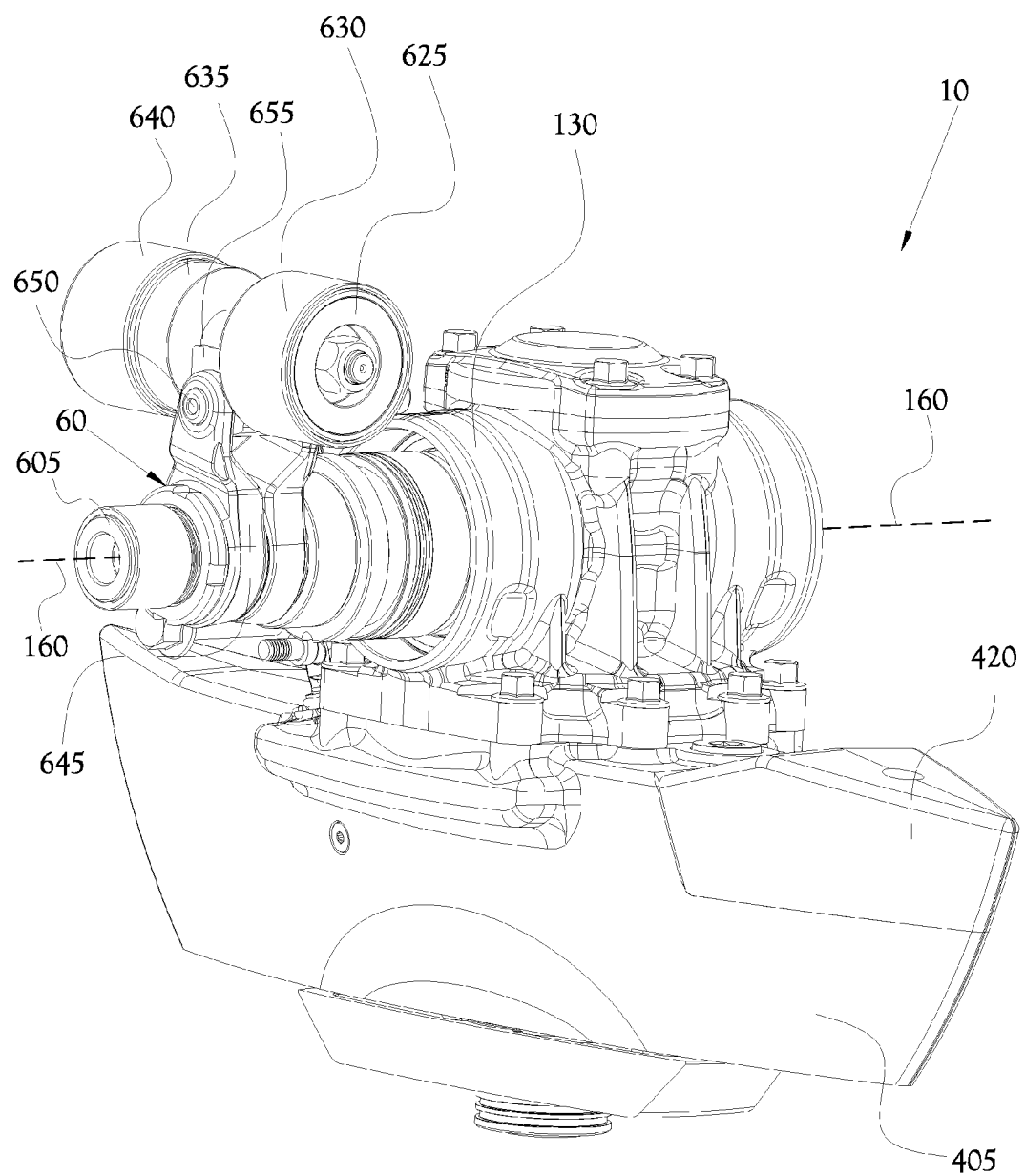
FIG. 16 is a left side perspective view of the trim actuator assembly illustrated in FIG. 14 with still additional components removed for clarity of view to show the construction and function of the trim actuator assembly for trimming the upper unit of the marine drive of the present invention.

Trim Actuator Assembly:

As illustrated in FIGS. 13A, 13B, and 13C, in the preferred embodiment the drive unit can be trimmed from a neutral position, illustrated in FIG. 13A, through a range from approximately +3 degrees, illustrated in FIG. 13B, to approximately −15 degrees, illustrated in FIG. 13C. The axis of trim 160 is illustrated in FIG. 17. Referring to FIGS. 14-16, in the preferred embodiment, a trim shaft 605, the center of which defines the axis of trim 160, is mounted to the upper unit 405 by means of a trunnion hub 130. A selectively energized trim actuator 615, which in the preferred embodiment is defined by a hydraulic pump, energizes a rotary actuator, which in turn, thereby, applies a rotational force to the trim shaft 605 in order to rotate trim shaft 605, and by extension, the upper unit 405, lower unit 440 and the torpedo-shaped propeller shaft housing 180, through the range of motion described herein.

In the preferred embodiment, a trim actuator 615 is a pump that selectively provides hydraulic pressure to a first piston 625, sliding within a first piston sleeve 630, and a second piston 635, sliding within a second piston sleeve 640 thereby moving first piston 625 and second piston 635 linearly within trim housing 680. A sliding block 655 is disposed between first piston 625 and second piston 635 and is acted on by the linear motion of first piston 625 and second piston 635. Sliding block 655 is, in turn, secured to a clevis 645 by clevis pin 650. Clevis 645 is carried by trim shaft 605 such that the linear movement of first piston 625 and second piston 635 is translated into rotational movement of trim shaft 605 through sliding block 655. Trim shaft 605 is in splined connection to the trunnion hub 130 such that rotation of trim shaft 605 is translated to trunnion hub 130 thereby rotating, and thus trimming, the upper unit 405 about trim axis 160.

It will be appreciated that in an alternate embodiment, other rotary actuators could be utilized to apply a rotational force to the trim shaft 605. In this regard, a selectively energized rack could be in geared communication with the trim shaft, which would define a pinion. In this arrangement the linear movement of the rack would be converted into rotational movement of the pinion/trim shaft. Of course, those skilled in the art will recognize that there are other means for selectively actuating the trim shaft 605. In the preferred embodiment, actuation is accomplished by use of a conventional power steering pump 615.

Figure 20:
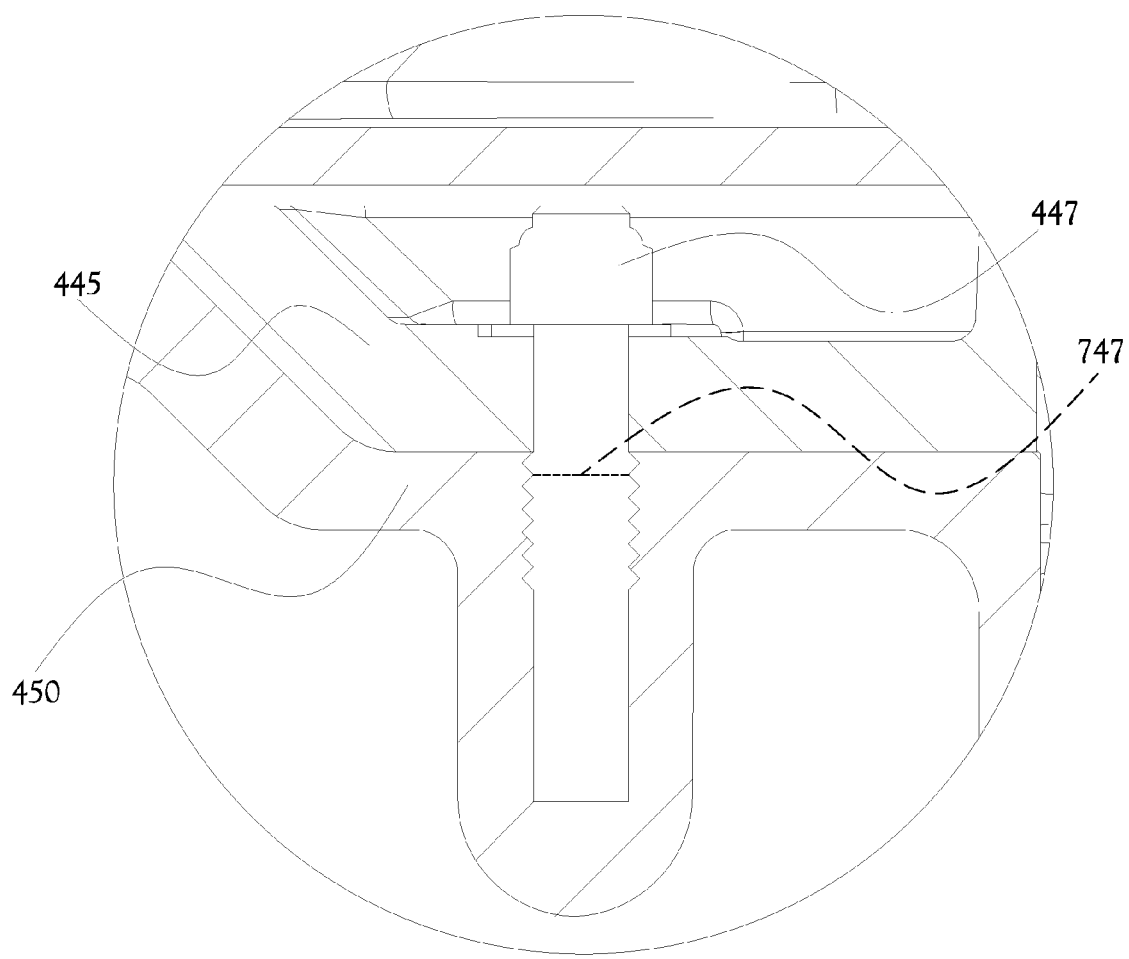
FIG. 20 is still a closer view, showing the bolts securing the lower unit to the coupling deck showing still an additional break-away feature for protecting the lower unit in the event of a collision with a submerged object.
Figure 21:
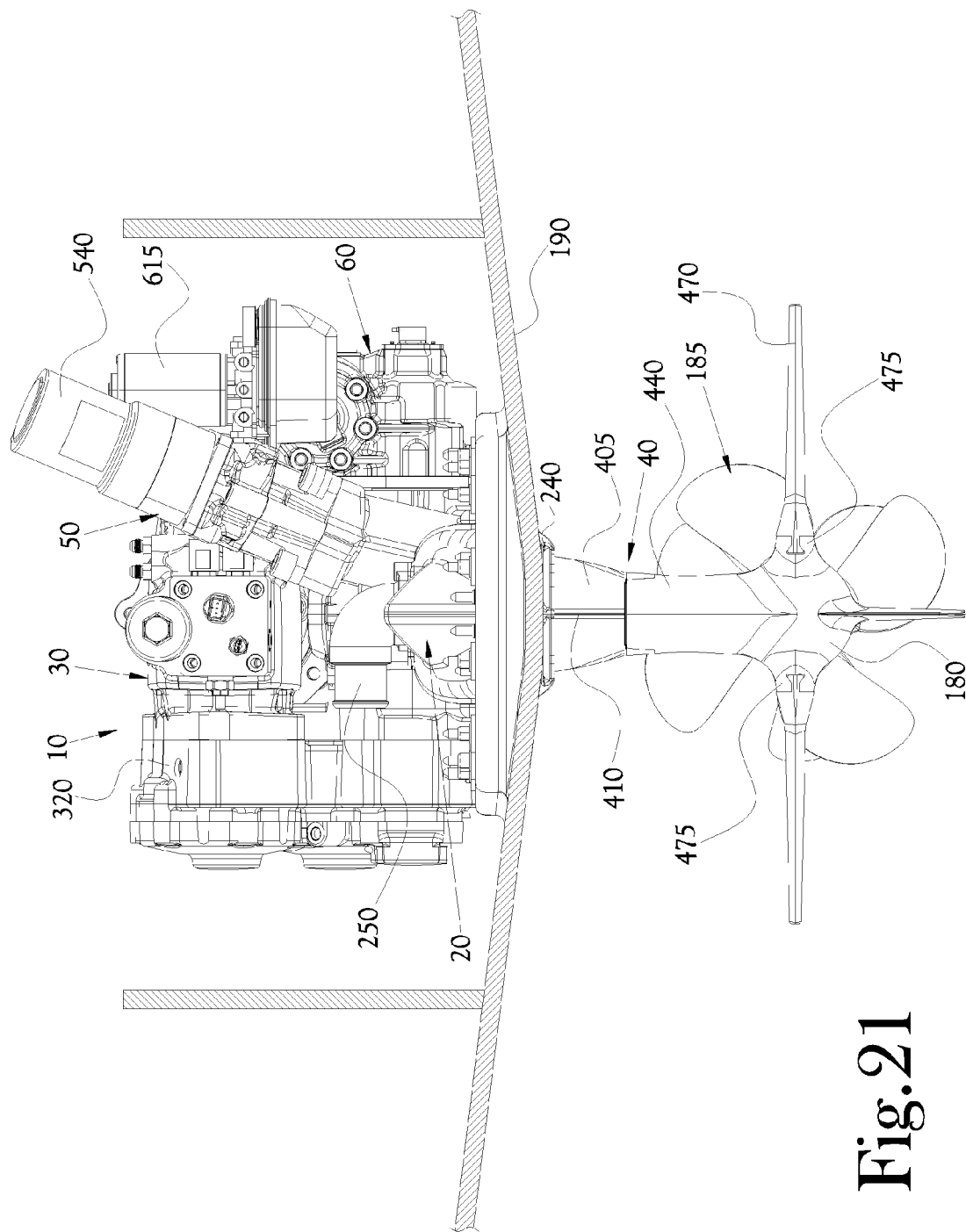
FIG. 21 is a partial cross-sectional view showing the marine drive of the present invention mounted within the hull of a vessel.

Break Away Lower Unit:

In the event of a collision with an underwater object, the lower unit 440 is designed to break away or to detach from the upper unit 405 so as to not damage the enclosure assembly 20, the steering actuator assembly 50, the trimming actuator assembly 60 the FNR transmission 30 or the motor 115. In this regard, referring to FIGS. 18-20, as discussed above, the coupling deck 445 is secured to the lower unit 440 by means of bolts 447. Bolts 447 are adapted to include a failure plane 747. Similarly, the coupling sleeve 460 is provided with a failure plane 760. In like manner, the steering shaft 140 and the vertical drive shaft 125 are each provided with failure planes 740 and 725, respectively. Each of the failure planes are adapted to fail in the event of a significant impact with an underwater object. In the preferred embodiment, the failure planes are adapted to fail upon the lower unit 440 or the torpedo-shaped propeller shaft housing 180 impacting an underwater object with sufficient force to generate a net approximate 1 G force on passengers in the boat. Upon failure of these failure planes, the lower unit 440 separates from the upper unit 405 prior to damaging the enclosure assembly 20 or other above-hull components of the marine drive system 10. In one embodiment, a tethered cable, not shown, could be adapted to retrieve the lower unit 440 in the event of such a collision. This tether would be used in the recovery of the lower unit 440, including the torpedo-shaped propeller shaft housing 180 and the props 185.

Additionally, in order to prevent upper unit 405 from damaging the enclosure assembly 20 upon impact with a submerged object, a decelerator pad, or bump-stop 420 is provided. Bump-stop 420 is carried by the stern end of the upper unit 405. In this regard, bump-stop 420 is constructed of a resilient, compressible, material such as rubber. Bump-stop 420 is adapted to absorb the force of the impact between the upper unit 405 and the enclosure assembly 20 in the event that the upper unit 405 is over-rotated, i.e. rotated beyond approximately +3 degrees of trim, as a result of an impact with a submerged object.

In the preferred embodiment, the shape of the lower unit 440, the upper unit 405, and the junction there between is such as to substantially prevent snagging or grabbing underwater objects. Further, the leading edges of the upper unit 405 and the lower unit 440 preferably have a profile selected such that underwater objects, such as neutral buoyancy pieces of driftwood, for example, are deflected down and away from the propeller 185 and the hull 190 of the boat. In this manner, marine drive system 10 is configured so as to minimize, if not prevent, damage to the hull 190 and portions of the marine drive system 10 disposed above the hull 190 of the boat.

Figure 22A:
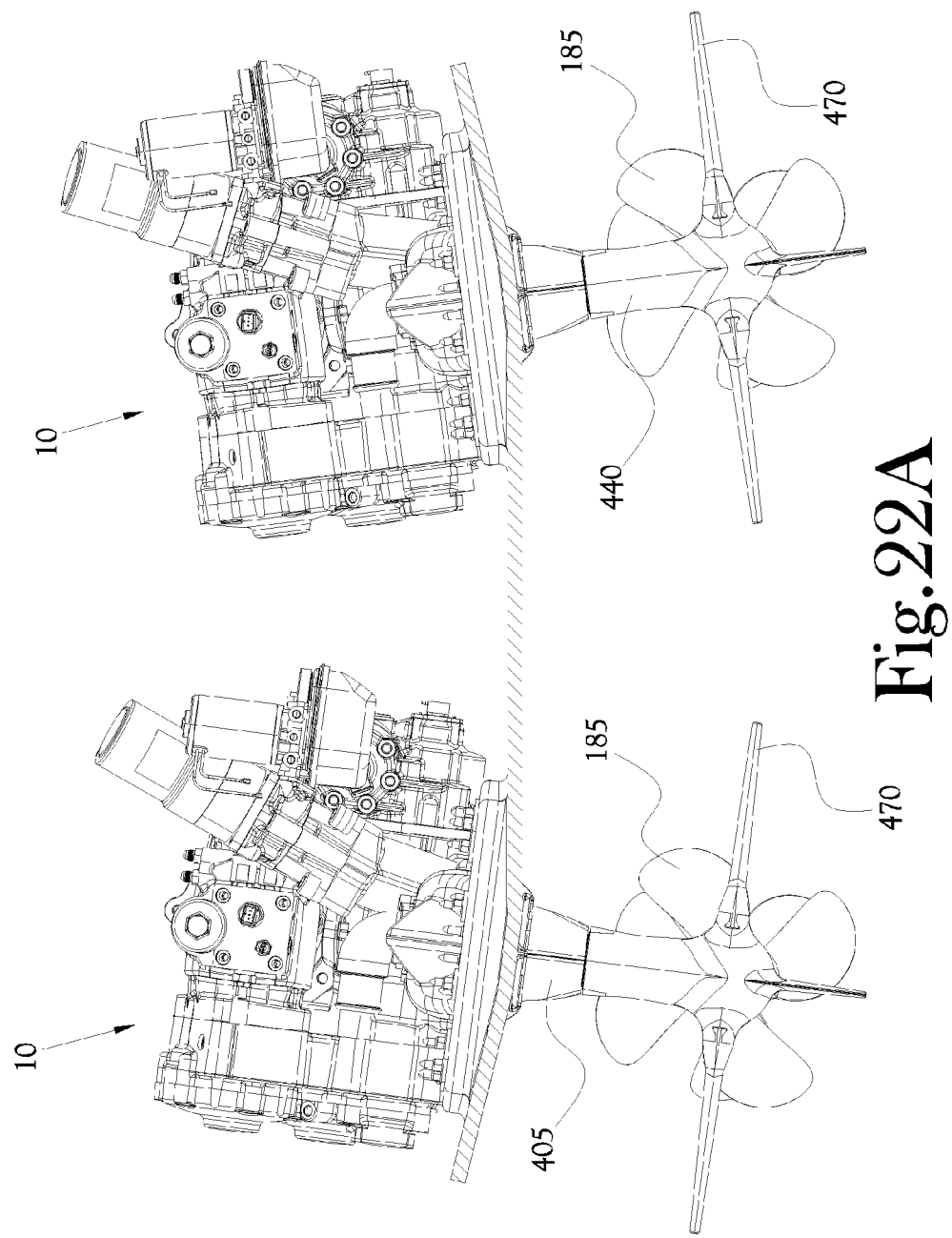

Marine drive 10 of the present invention has been described herein as a single drive unit mounted in a boat. However, those skilled in the art will recognize, as illustrated in FIGS. 22A and 22B, that the marine drive 10 of the present invention could be installed as a dual drive, in FIG. 22A, installed as a triple drive, in FIG. 22B, or as a quad drive as needed or desired. Further, it will be appreciated that while marine drive 10 has been shown and described as having both trim actuation and steering actuation in the preferred embodiment, the marine drive of the present invention could be produced with only trim actuation for use in vessels that are steered by rudder.

While embodiments are described herein, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A marine drive assembly adapted for being mounted in an opening in a boat hull, said marine drive assembly comprising:
    a drive unit extending downwardly through the opening in the boat hull, said drive unit having an upper unit adapted for trim actuation, and a lower unit coupled to said upper unit;
    an enclosure assembly disposed within the hull of the boat and sealed such that water is substantially prevented from entering the boat hull through the opening in the boat hull that receives the drive unit and which is adapted to enhance hydrodynamic efficiency and wake performance of said drive assembly;
    said enclosure assembly includes an upper portion disposed substantially within the hull of the boat, a gasket flange plate secured to said upper portion with a substantially water-tight seal, said gasket flange plate having a gasket flange extending radially outward, a retention plate for clamping said gasket flange plate against the hull forming a substantially water-tight seal, an O-ring gasket member formed from a resilient material for sealing a junction between said gasket flange and the hull and for further sealing a junction between said retention plate and said gasket flange, wherein said retention plate and said gasket flange plate are configured to closely follow a contour of the hull thereby providing a substantially seamless interface to the boat hull;
    a drive mechanism adapted to provide drive forces to a propeller, said drive mechanism adapted such that said drive unit and a marinized motor are positioned on a substantially common central line along a direction of thrust; and
    a trimming actuator assembly for adjusting trim of said upper unit, said trim mechanism including a trim shaft for trimming said upper unit about a trim axis, a rotary actuator for applying rotational movement to said shaft, and a selectively energized member for actuating said rotary actuator.

2. The marine drive assembly adapted for being mounted in an opening in a boat hull of claim 1 wherein said rotary actuator of said trimming actuator assembly is defined by at least a pair of selectively moveable pistons and a sliding block disposed between said selectively moveable pistons, wherein said sliding block is carried by a clevis mounted to said trim shaft such that linear motion of said moveable pistons is translated into rotary motion of said trim shaft.

3. The marine drive assembly adapted for being mounted in an opening in a boat hull of claim 1 wherein marine drive assembly further comprises a steering actuator assembly comprising a steering actuator, a planetary gear set in drivable communication with said lower unit for rotating said lower unit about a vertical steering axis, an articulating drive shaft for delivering rotational forces to said planetary gear set; at least one u-joint carried by said drive shaft for allowing tilting of said upper unit while maintaining said steering actuator in a fixed position.

4. The marine drive assembly adapted for being mounted in an opening in a boat hull of claim 3 wherein said drive shaft of said steering actuator assembly includes a u-joint disposed at each end of said drive shaft.

5. The marine drive assembly adapted for being mounted in an opening in a boat hull of claim 3 wherein said drive shaft of said steering actuator assembly is defined by a splined shaft.

6. The marine drive assembly adapted for being mounted in an opening in a boat hull of claim 1 wherein said marine drive assembly adapted for being mounted in an opening in a boat hull further comprises a breakaway system, said breakaway system being adapted to allow said lower unit to detach from said upper unit upon impact with an underwater object thereby preventing damage to said drive unit and said enclosure.

7. The marine drive assembly adapted for being mounted in an opening in a boat hull of claim 1 wherein said upper unit, said drive mechanism, and said lower unit are adapted to allow said lower unit to detach from said upper unit upon impact with an underwater object thereby preventing damage to said drive unit and said enclosure.

8. The marine drive assembly adapted for being mounted in an opening in a boat hull of claim 1 wherein said marine drive assembly further comprises at least one trim foil carried by said drive mechanism so as to move with said drive mechanism with the trimming of the drive unit, said trim foil being adapted to provide enhanced trim lift.

9. The marine drive assembly adapted for being mounted in an opening in a boat hull of claim 8 wherein said trim foil is adapted to provide enhanced positive trim lift.

10. The marine drive assembly adapted for being mounted in an opening in a boat hull of claim 8 wherein said trim foil is adapted to provide enhanced negative trim lift.

* * * * *